(12) United States Patent
Wang et al.

(10) Patent No.: US 11,546,017 B2
(45) Date of Patent: Jan. 3, 2023

(54) SYSTEM AND METHOD OF POWER LINE COMMUNICATION

(71) Applicant: Focus Universal Inc., Ontario, CA (US)

(72) Inventors: Desheng Wang, Diamond Bar, CA (US); Cailin Tian, Ontario, CA (US)

(73) Assignee: Focus Universal Inc., Ontario, CA (US)

( * ) Notice: Subject to any disclaimer, the term of this patent is extended or adjusted under 35 U.S.C. 154(b) by 0 days.

(21) Appl. No.: 16/760,857

(22) PCT Filed: Nov. 29, 2019

(86) PCT No.: PCT/US2019/063880
§ 371 (c)(1),
(2) Date: Apr. 30, 2020

(87) PCT Pub. No.: WO2021/107961
PCT Pub. Date: Jun. 3, 2021

(65) Prior Publication Data
US 2022/0286161 A1    Sep. 8, 2022

(51) Int. Cl.
*H04B 3/54* (2006.01)

(52) U.S. Cl.
CPC .................................... *H04B 3/54* (2013.01)

(58) Field of Classification Search
CPC ........... H04B 3/54; H04B 3/542; H04B 3/544
See application file for complete search history.

(56) References Cited

U.S. PATENT DOCUMENTS

| | | | |
|---|---|---|---|
| 5,852,636 A * | 12/1998 | Mathieu | H04L 27/122 375/295 |
| 6,608,552 B1 | 8/2003 | Fogel et al. | |
| 7,424,065 B2 | 9/2008 | Walker | |
| 9,509,456 B2 | 11/2016 | Ott et al. | |
| 2004/0122531 A1* | 6/2004 | Atsuta | H04L 12/2803 700/1 |

FOREIGN PATENT DOCUMENTS

WO    WO 2021/107961    6/2021

OTHER PUBLICATIONS

Shachi, P. "Evaluation of Costas Loop for BPSK Demodulation" IJECT vol. 7, Issue 3, Jul.-Sep. 2016. Obtained from https://www.semanticscholar.org/paper/Evaluation-of-Costas-Loop-for-BPSK-Demodulation-Shachi/13dd3b55ddb80f24089a37cea3c5c64e7287fdf3 (Year: 2016).*

* cited by examiner

*Primary Examiner* — David S Huang
(74) *Attorney, Agent, or Firm* — Knobbe, Martens, Olson & Bear, LLP

(57) ABSTRACT

Disclosed is a system and method for power line control of devices. The system operates in two modes. In mode one, the system operates on an open loop architecture with a controller generating a sinusoidal wave using a crystal oscillator. Control information is added to the sinusoidal wave by alternating the output of two phase shifted waves which have the same frequency and amplitude to form a control signal. The resulting control signal is sent on a power line. The control signal is received using a crystal filter, decoded and converted to executable instructions for the devices and data parameters for sensors. In mode two, the system operates on a hybrid open loop/closed loop architecture where devices are jointly controlled by the controller and the sensors.

19 Claims, 12 Drawing Sheets

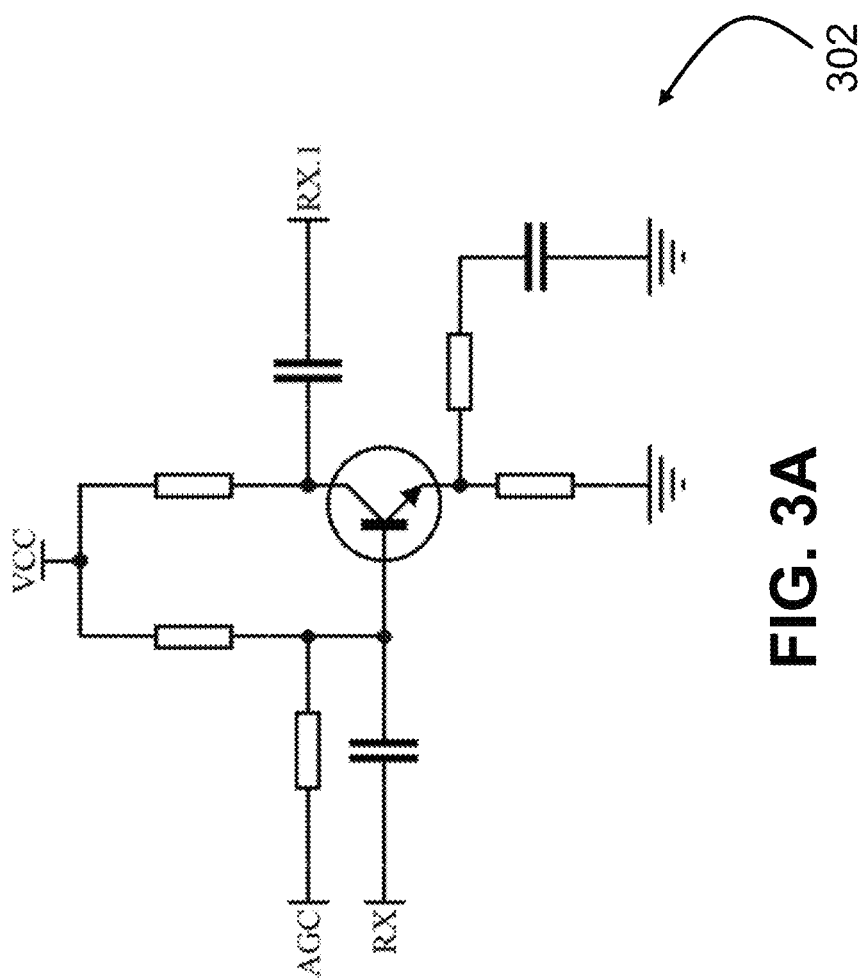

SYSTEM AND METHOD OF POWER LINE COMMUNICATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field

The present invention relates to a system and method of power line communication.

2. Background

Power line communication (PLC) to control devices and pass data is a well-known technology. Electrical power companies have used it since the first half of the twentieth century for telemetry and other selected uses. Typically, a residential power line communication system operates by modulating a carrier wave of between 20 and 200 kHz place on to the household wiring by a transmitter. The modulation wave is typically a digital wave. The technology was adapted for use within commercial and home settings in the 1970s with the development of X10, a narrowband power line communication system. As a system, X10 combined hardware, including transmitters and receivers, with a new transmission protocol. Since the carrier signal may propagate to nearby homes (or apartments) on the same distribution system, these control schemes have a "house address" that designates the owner. Further, each receiver in the system has an address allowing each device including a receiver on the system to be individually sent commands using signals transmitted over the household wiring and decoded at the receiver. These devices may be either plugged into regular power outlets, or permanently wired in place. X10 generates 120 kHz bursts at the zero crossings of the alternating current power wave. X10 suffers from several drawbacks, primary among which was an inability to effectively send communication signals despite the electrical noise existing on power lines. The noise being introduced by devices connected to those lines for power. X10 also has transmission distance limitations due to the relative weakness of the signal, and the transmission signal suffers from phase change whenever the signal crosses a terminal.

More recently, digital technology has been brought to bear on PLC. In 1999, the Universal Powerline Bus (UPB), another narrowband power line communication system, was introduced. UPB uses pulse-position modulation to encode data on the power signal. Essentially, pulse-position modulation is a form of amplitude modulation. In pulse-position modulation, a pulse may be generated by the discharge of a capacitor in one of four positions in a frame placed toward the end of every half cycle of the AC power wave. The position of pulse indicates a discrete integer value from zero to three. Thus, the UPB protocol is capable of generating two bits every cycle, and a byte every four cycles. Messages in the protocol can be from 7 to 25 bytes. A major advantage of UPB was that the messaging protocol of UPB allowed for the "linking" of devices. With "linking" a single message could be sent, and the message could include different commands, or the same command, for each device in the link. In this way, multiple light fixture could be adjusted to a particular scheme with one touch of a control.

UPB pulses are relatively weak in comparison to the AC power signal they use as a carrier wave. Certain devices or appliances generate electrical noise in the same range as the power signal, which interferes with the pulse position modulation of the UPB system. One such device is a fan, which generates as much or more noise than most devices. The main source of electrical noise in a fan is the commutator brushes, which can bounce as the motor shaft rotates. This bouncing, when coupled with the inductance of the motor coils and motor leads, can lead to a lot of noise on the power line and can even induce noise in nearby lines. This noise can interfere with system sensors and can even impair the system microcontroller by causing voltage dips on the regulated power line. Large enough voltage dips can corrupt the data in microcontroller registers or cause the microcontroller to reset.

A number of potential solutions to the noise generated by fan motors and other devices have been proposed and implemented within UPB. Among these are adding capacitors either across the fan motor terminals, or from each motor terminal to the case for grounding, keeping motor power leads short, and introducing filtering circuits. The filtering circuits may be plugged in to an outlet or hard wired in at an electrical panel. Each of these solutions either generates further problems that must be solved or is costly to implement in both equipment and labor.

There has been much work done recently in pulse modulating a carrier wave to send signals which convey information through phase shifting. However, extensive filtering of the signal is required, particularly when a user wished to create an ultra-narrow band signal. The ultra-narrow band signal can have as little as a single frequency bandwidth. High enough energy densities may allow for such a signal to be used in powerline control, but there is no known way to ultra-narrow hand filter such modulations as baseband. Further, at the RF level, the filters are complex and must be hand tuned. Finally, there is no known way to build a zero group delay narrow band filer into a digital signal processing (DSP), finite impulse response (FIR) or infinite impulse response (IIR) filter.

Other attempts have been made at a broadband version of power line communication. Broadband over power line (BPL) is a system to transmit two-way data over existing alternating current medium voltage (AC MV) electrical distribution wiring, between transformers, and alternating current low voltage (AC LV) wiring between transformer and customer outlets (typically 110 to 240 V). Such systems, like all state-of-the-art power line communication systems, do avoid the expense of a dedicated network of wires for data communication, and the expense of maintaining a dedicated network of antennas, radios and routers in wireless network.

BPL uses some of the same radio frequencies used for over-the-air radio systems. Modern BPL employs frequency-hopping spread spectrum to avoid using those frequencies actually in use, though early pre-2010 BPL standards did not. The BPL OPERA standard is used primarily in Europe by internet service providers. In North America, the BPL OPERA standard is used in some places (Washington Island, Wis., for example) but is more generally used by electric distribution utilities for smart meters and load management.

However, since the ratification of the IEEE 1901 (HomePlug) LAN standard and its widespread implementation in mainstream router chipsets, the older BPL standards are not optimal for communication between AC outlets within a building, nor between the building and the transformer where MV meets LV lines. Deployment of BPL has illustrated a number of fundamental challenges, the primary one being that power lines are inherently a very noisy environment. Every time a device turns on or off, it introduces a pop or click, that is to say electrical noise, into the line. Switching power supplies often introduces noisy harmonics into the line. Devices such as relays, transistors, and rectifiers create noise in their respective systems, increasing the likelihood of signal degradation. Arc-fault circuit interrupter (AFCI) devices, required by some recent electrical codes for living spaces, may also attenuate the signals. Finally, transformers and DC-DC converters attenuate the input frequency signal almost completely. "Bypass" devices become necessary for the signal to be passed on to the receiving node. A bypass device may consist of three stages, a filter in series with a protection stage and coupler, placed in parallel with the passive device. And unlike coaxial cable or twisted-pair, standard electrical wiring has no inherent noise rejection.

The second major issue is electromagnetic compatibility (EMC). The system was expected to use frequencies of 10 to 30 MHz in the high frequency (HF) range, used for decades by military, aeronautical, amateur radio, and by shortwave broadcasters. Power lines are unshielded and will act as antennas for the signals they carry, and they will cause interference to high frequency radio communications and broadcasting. In 2007, the NATO Research and Technology Organization released a report which concluded that widespread deployment of BPL may have a possible detrimental effect upon military HF radio communications.

For the foregoing reasons, there is a need for a system which can provide power line communication without detrimental effects from noise and at sufficient data rates.

BRIEF SUMMARY

Disclosed is a system for controlling devices via power line communication. The system may include a controller which sends commands indicative of a user's operation of the controller. The system may further include a first transceiver, which may be electrically connected to the controller. The first transceiver may include a first transmitter. The first transmitter may include a first crystal oscillator circuit. The first crystal oscillator circuit may include a first crystal oscillator powered to transmit a sinusoidal wave at a clock frequency from a first output. The first transmitter may further include a second crystal oscillator circuit. The second crystal oscillator circuit may include a second crystal oscillator, which may be powered to transmit a sinusoidal wave at a transmission frequency and a first phase from a second output. The first transceiver may further include a signal splitter. The signal splitter may be connected to the second output. The signal splitter may split sinusoidal wave to a first signal and a second signal. The signal splitter may output the first signal to a third output and may output the second signal to a fourth output. A phase shift circuit may be connected to the fourth output and the first output. The phase shift circuit may receive the second signal and phase shift the second signal to a second phase. The amount of phase shift may be indexed by a ratio of the clock frequency to the transmission frequency. The phase shift circuit may further include a fifth output for outputting the second signal at the second phase. The first transceiver may further include a switch. The switch may include a first terminal, a second terminal, and a third terminal. The switch may be electrically connected to the third output at the first terminal, the fifth output at the second terminal, and to a baseband signal output transmitting a baseband signal at the third terminal. The switch may operate to switch between alternately outputting the first signal and the second signal as directed by the baseband signal. The output combination of the first signal and the second signal may form a control signal. The switch may further include a transceiver output on a common of the switch for outputting the control signal. The system may further include a power line, which may be electrically connected to the transceiver output. The system may further include one or more electrical outlets electrically connected to the power line. The system may further include one or more devices electrically connected to the one or more electrical outlets. The one or more devices may each include a second transceiver. The second transceiver may include a receiver. The receiver may include a ultra narrow band crystal filter which may filter a bandwidth centered around the transmission frequency. The one or more devices may further include a baseband decoder, which may be electrically connected to the ultra narrow band crystal filter. The baseband decoder may recover the baseband signal from the control signal.

Further disclosed is a method for providing power line communication. The method may include generating a sinusoidal wave using a crystal oscillator. The method may further include splitting the sinusoidal wave in to a first signal and a second signal. The method may further include phase shifting the second signal using a phase shift circuit. The method may further include outputting the first signal and the second, phase shifted signal to a switch. The method may further include forming a control signal by operating the switch to alternate between outputting the first signal and the second, phase shifted signal according to a baseband signal, the first signal and the second, phase shifted signal imparting different phase states to respective portions of the control signal, the respective portions encoding binary information on the control signal. The method may further include outputting the control signal to a power line. The method may further include receiving the control signal on a receiver including an ultra narrow band filter, the receiver being electrically connected to the power line. The method may further include decoding the control signal to executable instructions using the protocol. The method may further include controlling the operation of at least one device based on the decoded control signal.

Further disclosed is a system for providing power line communication. The system may include a smart device which may send commands which may be created according to, and interpreted by, a protocol. The system may further include a first transceiver electrically connected to the smart device. The transceiver may include a first crystal oscillator generating a first signal sent to a first output. The system may further include a signal splitter connected to the first output. The signal splitter may output the signal received from the first output to a second output and may output a copy of the signal received from the first output to a third output. The system may further include a phase shift circuit connected to the third output and including a fourth output, the phase shift circuit may be configured to shift the phase of the copy of the first signal. The phase shift circuit may output the second signal to the fourth output. The system may further include a switch. The switch may have a first terminal which may be electrically connected to the second output and may have a second terminal which may be electrically connected to the fourth output. The switch may further include a transceiver output. The system may further include a first processor, which may be electrically connected to the smart device, the switch, and to a first memory. The first memory may contain the protocol. The first processor may execute the protocol according to the commands from the smart device in order to generate a baseband signal output to the switch. The baseband signal may control the operation of the switch. The system may further include a power line. The power line may be connected to the transceiver output. The system may further include at least one device, which may be electrically connected to the power line. The at least one device may include a first receiver including a first ultra narrow band filter, a second processor, which may be electrically connected to the first ultra narrow band filter, and a second memory, which may be electrically connected to the second processor. The second memory may contain a first copy of the protocol. The system may further include at least one sensor. The at least one sensor may be connected to the power line. The at least one sensor may include a second transceiver. The second transceiver may include a second receiver including a second ultra narrow band filter, and a third processor. The third processor may be electrically connected to the second ultra narrow band filter. A third memory may be electrically connected to the third processor. The third memory may contain a second copy of the protocol. When a user operates the smart device, a command may be sent. The protocol, executing on the first processor, may convert the command to a control signal by sending a baseband signal to the switch. The switch, according to the baseband signal, alternates between outputting a first signal and a second signal in order to encode the control signal with binary information. The control signal may be output to the power line and may be received at the first ultra narrow band filter, second ultra narrow band filter, or both. The control signal may be analyzed by the first copy of the protocol, second copy of the protocol, or both. The decoded control signal may be executed on the second processor, or the third processor, or both. The control signal may be converted to instructions for controlling the at least one device, or providing parameters for the at least one sensor, or both.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3A shows a circuit diagram of the high frequency amplifier portion of the receiver of the transceiver;

DETAILED DESCRIPTION

Figure 1:
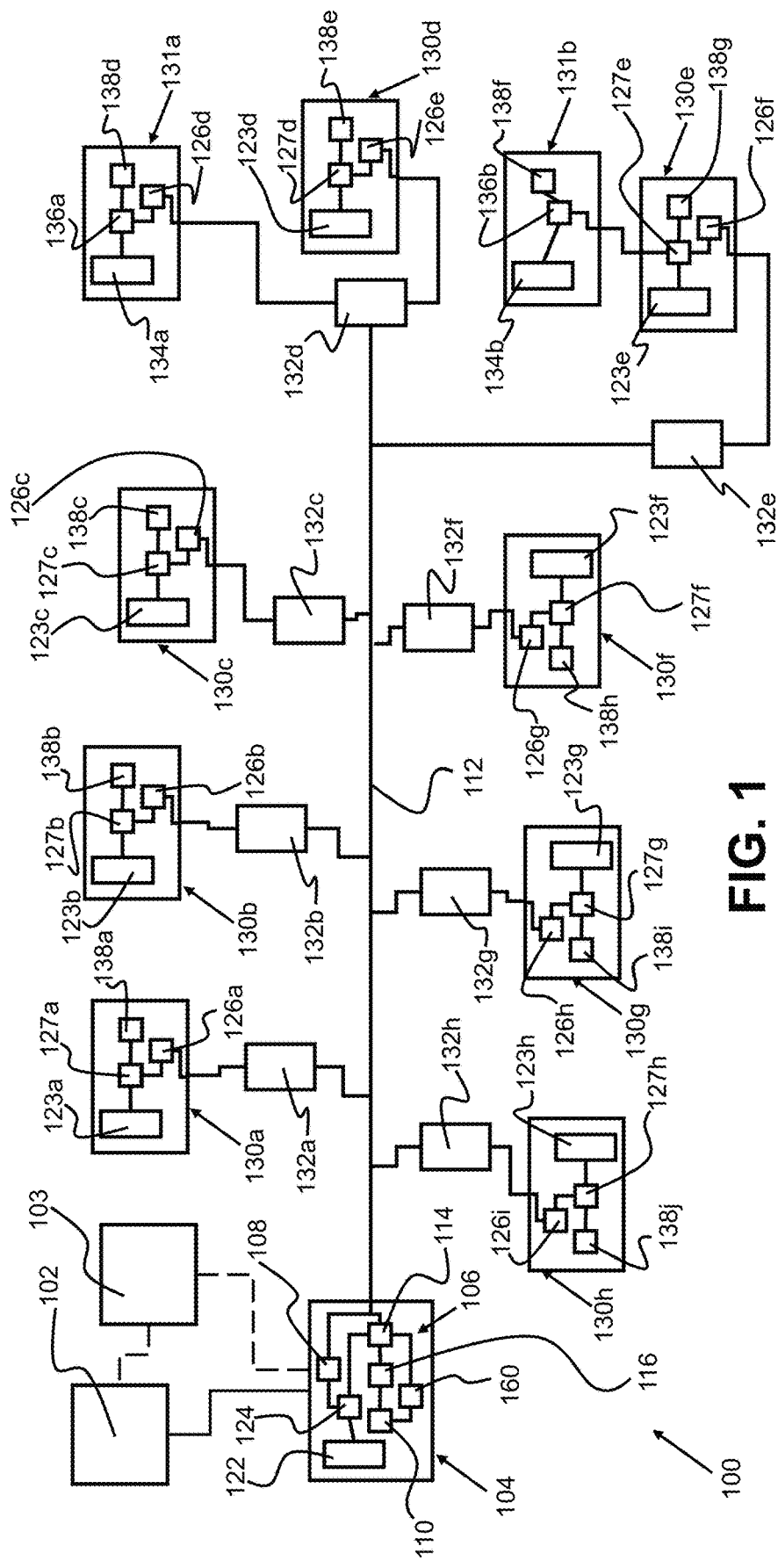
FIG. 1 shows a schematic diagram of an exemplary PLC system.

The detailed description set forth below in connection with the appended drawings is intended as a description of the presently preferred embodiment of system and method to control devices through powerline control, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Disclosed is a system and method to control devices with control signals and send data through a powerline. Control signals are sent via power line communication to eliminate the need for a dedicated control cable infrastructure as part of the system. The transmitter on a first end of a powerline may be mirrored by a receiver at another end of a powerline. The receiver may be integrated with the device being controlled or may be a separate component of the system placed between the device to be controlled and the transmitter. Moreover, each of the transmitter and the receiver may be combined to form a transceiver. Indeed, in most embodiments, all such devices are transceivers. At least one transceiver on the system may further include circuitry which allows connection to a wireless device A controller may be electrically connected to the transceiver, which is, in turn, connected to the power line. The disclosed system may use a building's or even neighborhood's, or even region's pre-existing electrical wiring infrastructure to send control signals. Sending control signals to control components of a system and transfer data among components is commonly called power line communication (PLC). The use of PLC completely eliminates the requirement for creating a cable infrastructure separate from that of the power line in order to carry the data and control signals. In the state-of-the-art non-PLC systems such signals are carried on an ethernet or RJ12 cable infrastructure, or transferred wirelessly. The power line of a device or sensor may be connected to one or more conventional outlets for providing power to the devices or sensors. Each of the one or more outlets may have one or more sockets. One or more devices may plug in to one of the one or more sockets of each of the one or more outlets, thereby electrically connecting the devices to the power line. The power line may carry two separate signals. The first may be a power signal placed on to the powerline by a power company. The second may be a control signal placed on the power line by the transmitter controlled by a user.

The system operates without the power signal acting as a carrier wave or the power signal otherwise being changed in any way to convey information. The power signal and the control signal are completely separate signals. The power signal is typically at 50 Hz or 60 Hz, but may be at other frequencies, depending on the area of the world and the existing power signal conventions there. However, the control signal may have a frequency in the kHz to double or triple-digit MHz range, or even GHz range. Thus, while the two signals exist on the same line, they have limited or no interaction.

The system may generate more than one a sinusoidal wave for use in encoding information. For example, the system may generate two sinusoidal waves at the same frequency and amplitude. The two sinusoidal waves may be generated by two crystal oscillators or may be generated by one crystal oscillator and the signal split to form two signals. To generate each of the two sinusoidal waves, power may be applied to one or more crystal oscillators. Each of the one or more crystal oscillators generate a constant sinusoidal wave in the high kHz to MHz range and with a high Q factor. Importantly, when more than one crystal oscillator is used, crystals of near identical construction may be used so that the crystals generate signals of identical frequencies without a requirement for frequency correction. The crystal oscillators may form part of a larger transmitter. A controller may be connected to the transmitter. One of the two sinusoidal waves may be phase shifted. Each of the waves may be assigned to represent a binary state.

Contemporaneously to the generation of the sinusoidal waves, a user may manipulate the controller to send information to an electrically connected processor executing a protocol. The processor uses the protocol to convert the information from the controller in to control information to be encoded on the sinusoidal wave. In order to encode control information using the two sinusoidal waves, the processor, according to the protocol, controls a switch which selectively chooses one or the other of the sinusoidal waves to be serially added to the power line. The control information may be formed in to a baseband signal, such as a digital wave. Thus, it is the switch that is controlled by the protocol, and specifically, the protocol using the baseband signal, to encode the signal with information. One sinusoidal wave having a first phase may be used to represent either one or zero in the protocol, and the second sinusoidal wave may represent the other of the one or zero. The timing of the switching, and thereby the placement and spacing of the phased waves, is done according to command information sent from the controller which is then converted by the protocol. The resulting signal with the encoded control information, called a control signal, is sent through the power line.

Once the control signal is output to a power line, the control signal travels the extent of that power line, and any connected power lines. That is, the control signal will continue on the power line to every terminal in a structure, or even beyond a structure, depending on the design of the power system and the PLC system. In this way, the control signal is broadcast on the power line.

On the receiving end, a device may be plugged in to a socket of the one or more outlets. This electrically connects the device to the power line and allows the device to receive both the power signal and the control signal present on the power line. On the device or an adapter placed between and connected to both the device and the power line, an ultra narrow band filter, as part of a receiver, may filter out all of the signal on the power line except a bandwidth of, for example, 10 Hz or less centered on the transmission frequency of the crystal oscillators. Alternatively, the filter may allow more than a 10 Hz band to pass. Thus, the crystal filter acts as a bandpass filter, and filters only a narrow band centered on the transmission frequency, and allows the rest of the signal to remain on the powerline. Once the control signal is received, the receiver may send the control signal to a processor for analysis by the protocol and decoding back to baseband. The protocol may be stored on a memory in the device or may be stored on the adapter electrically connected to both the power line and the device. According to the protocol, a determination may be made if the control signal is directed to the device, if not, the control signal is ignored. If the control signal is directed to the device, the protocol, executing on a processor, converts the control signal in to executable instructions for controlling the device. A single control signal transmission may include one or more commands. When there is more than one command on the control signal, the commands may be the same command for different devices, or different commands for the same device, or both.

Using this protocol, a single controller and transceiver combination can control multiple individual devices on the system. All of this can be accomplished without being affected by the electronic noise on the power line. The system includes robustness against noise due to several features. First, the ultra-narrow bandwidth, which is at or approaching one Hertz, is only affected by noise which is on that specific frequency. Relatedly, all the energy of the signal is placed on the same single frequency, resulting in a high energy density for the signal. Finally, the information on the signal is encoded by a very specific phase differential. One phase indicating a first binary state, and the other phase representing a second binary state. Unless the noise includes these specific phase changes, the signal may still be detected.

It may be possible for the devices to be controlled autonomously either by automated control signals sent by the controller, or by automated control signals sent from sensors, or both. Each device may have one or more sensors electronically connected to it. In some embodiments of the system, the one or more sensors may be physically integrated with the device. When this is the case, the one or more sensors and the device may share a transceiver. When the one or more sensors are physically separate from the device, for example, when one sensor may be assigned to control two or more devices and electronically connected to each device the sensor is assigned to control. Each sensor may include a transceiver. When the sensor includes a transceiver, the sensor may include instructions stored in a memory on the sensor which may be programmed by the controller. The instructions may be to change the state of the device if certain criteria are detected by the sensor. For example, if the sensor is a temperature sensor and the device a light, and a first temperature is detected, the instructions may send a command dimming the light. If a second temperature is detected by the temperature sensor, the instructions may send a command for turning the light off. The control signal is generated by the temperature sensor in the same manner as the controller, except the commands are drawn from a predetermined list stored on a memory of the temperature sensor, and triggered by conditions detected by the sensor, rather than being triggered manually as with a user's use of a smart device or controller. In addition, the controller may also have a list of automated commands stored in memory. The commands may be triggered by conditions detected by a connected sensor, or may be triggered by other conditions. For example, the command may be tied to a specific time, and the command executes when the clock on the controller reaches that time.

More specifically, as shown in FIG. 1, the system 100 may include a controller 102. The controller 102 may be electrically connected to a transceiver 104. The controller 102 may be a programmable logic controller which is connected to the transceiver 104 via a wired connection, for example, a low voltage wired connection as is well known in the art. Alternatively, the transceiver 104 and the controller 102 may be integrated in a single housing. Still further alternatively, or in addition, the controller 102 may be configured to allow control functionality to be passed to an external device. For example, a device running a software package available for personal computers with operating systems such as Microsoft® Windows®, Mac® OS, Unix, Linux, etc. This configuration can allow a user to use a standard computer as an extension of the controller 102. Still further alternatively, a user may use a mobile computing device 103 as an extension of, or in place of, the controller 102. For example, Android®, iOS®, and Windows® based mobile computing devices, such as smart phones and tablets can be used as an extension of, or in place of, the controller 102. A user can install an application onto the mobile computing device 103. The application can allow the mobile computing device 103 to function as an extension of, or in place of, the controller 102.

Regardless of what specific device is utilized as an extension of, or as the controller 102, the user interface may communicate data to a routing device over a communication link. In one embodiment, the communication link can be a wireless communication link, for example, Wi-Fi, Bluetooth®, cellular (3G, 4G, 5G, LTE, etc.), or other suitable wireless communication technology. Alternatively, the communication link could be a wired connection, such as Ethernet or other open and/or dedicated communication protocols. The routing device can be a standard WiFi® local area network (LAN) router for receiving data, and then routing it to a device. The routing device may be integrated with the controller 102.

A touch screen or a display (not shown) on the controller 102 or external computing device 103 may be used as a system interface by a user (not shown). Certain commands which may be executed by the protocol may be indicated by control surfaces on the touch screen. For example, the commands may be indicated by icons or text, or a combination of both. When a user touches the portion of the screen with the control surface, a command is sent in a message to the processor in the transceiver 104, which interprets the command using the protocol.

The transceiver 104 may include a transmitter portion 106 and a receiver portion 108. The primary function of the transceiver 104 is to send signals as directed by the controller 102 through the processor. The transmitter portion 106 of the transceiver 104 sends a signal upon which control information is encoded. The receiver portion 108 of the transceiver 104 receives data signals from the devices or sensors. For example, the devices 130a-h and the sensors may send acknowledgements of messages or self-identification information to the transceiver. For example, devices may include an actuator, a fan, a light, a ballast for a light, a valve, a computer numerical controlled machine, a robot, a conveyor belt, or any other electrical or electrically controlled device.

Figure 2A:
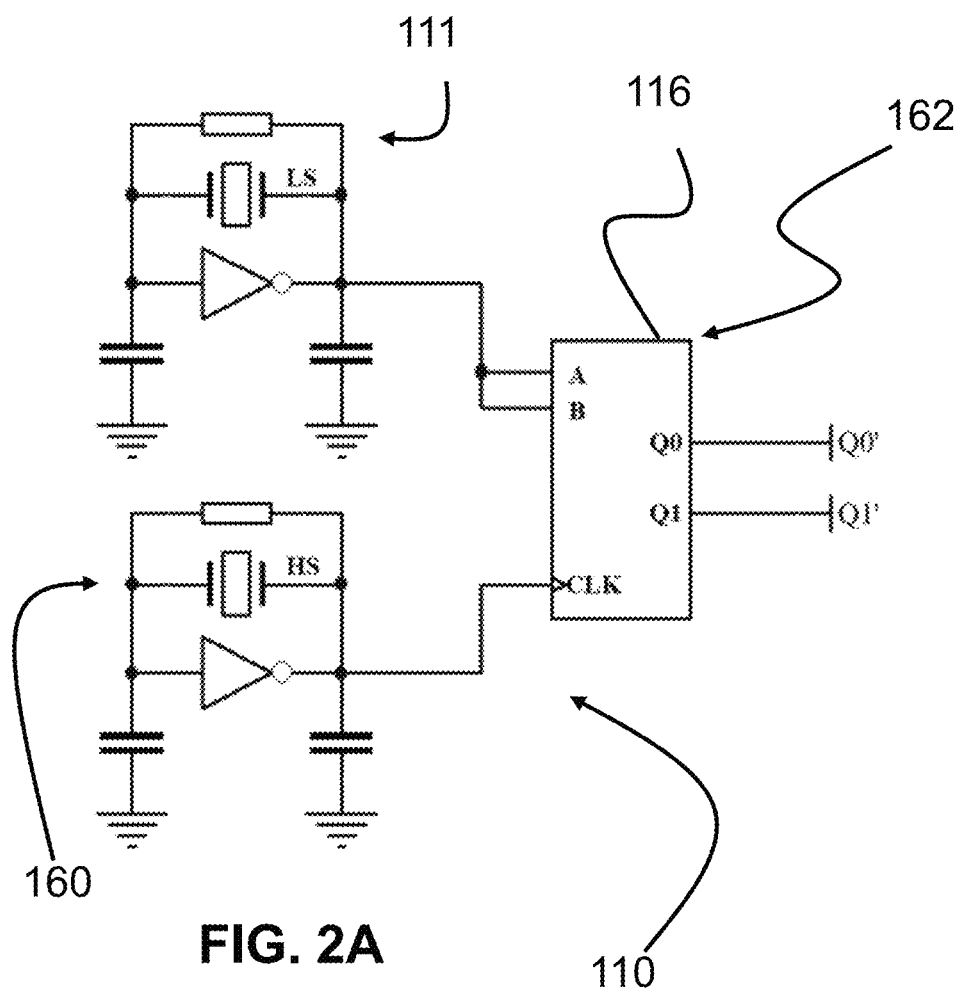
FIG. 2A shows a circuit diagram of one embodiment of the crystal oscillator and integrated circuit portions of the transceiver.

As shown in FIGS. 1 and 2A, the transmitter portion 106 of the transceiver 104 may include a crystal oscillator circuit 110. The crystal oscillator circuit 110 draws power from the power line 112. The power is taken from the power line 112 and may be transformed down by a transformer 138a-j to a lower voltage. The power may also be converted from alternating current to direct current. The voltage may be transformed down, for example, from 110V to 5 V. On a 0.2 A circuit of the power line 112, the 5 V of transformed voltage produces one watt of power for the crystal oscillator circuit 110. As shown in FIG. 2A, each of two crystal oscillators may output a signal. The first crystal oscillator may have a first predetermined primary frequency and amplitude. The second crystal oscillator may have a second predetermined primary frequency and amplitude, with the second primary frequency being a multiple of the first primary frequency. In the embodiment of FIG. 2A, one crystal oscillator produces a signal which is split to form the two sinusoidal waves for forming the control signal. The second crystal oscillator 160 provides a clock signal. The clock signal may be used to control the amount of phase shifting. For example, if a crystal oscillator of 1 MHz is used to produce the signals for transmission, the crystal oscillator for the clock signal may be a multiple of 4 MHz. For example, the crystal oscillator producing the clocks signal may be 16 MHz. Based on the ratio, the transceiver may produce as many as 15 phase shifted signals of the 1 MHz signal, using the 16 MHz clock signal, as is described in further detail below. One or more of the phase-shifted signals, along with the original signal, may be used to encode information, as is described in further detail below. As long the crystal oscillators receive power, the crystal oscillators will continue to output a signal.

Crystal oscillators emit a sinusoidal wave at a frequency determined by their physical structure. Importantly, crystal oscillators, and particularly quartz crystal oscillators, have a very high Q factor. Quartz crystal oscillators are capable of primary frequencies from in the high kHz up to the MHz range. However, higher frequency signals, up in to the GHz range, may be produced by amplifying a harmonic of the primary frequency. Further, this disclosure also contemplates using amplified harmonics of the oscillator, and even potentially frequency modulated amplified harmonics, to allow transmission frequencies as low as 1 Hz. Also, as indicated by the high Q factor, they have a narrow bandwidth relative to their frequency. A typical Q factor for a quartz oscillator ranges from $10^4$ to $10^6$, compared to $10^2$ for an inductor and capacitor, or LC, oscillator. The maximum Q for a high stability quartz crystal oscillator can be estimated as $Q=1.6\times10^7/f$ where f is the resonant frequency in megahertz.

Another important aspect of quartz crystal oscillators is that quartz crystal oscillators exhibit very low phase noise. In many oscillators, any spectral energy at the resonant frequency is amplified by the oscillator, resulting in a collection of tones at different phases. In a crystal oscillator, the crystal mostly vibrates on one axis, therefore only one phase is dominant. Low phase noise makes crystal oscillators particularly useful in applications requiring stable signals and very precise time references. This is particularly important with this disclosure as the signal from one of the crystal oscillators may be phase shifted by a precise amount. In an embodiment, for optimum operation of the system, the phase shift between the two signals is consistent, as is discussed below in greater detail.

A quartz crystal provides both series and parallel resonance. The series resonance is a few kilohertz lower than the parallel resonance. Crystals below 30 MHz are generally operated between series and parallel resonance, which means that the crystal appears as an inductive reactance in operation, this inductance forming a parallel resonant circuit with externally connected parallel capacitance. Any small additional capacitance in parallel with the crystal pulls the frequency lower. Moreover, the effective inductive reactance of the crystal can be reduced by adding a capacitor in series with the crystal. This latter technique can provide a useful method of trimming the oscillatory frequency within a narrow range; in this case inserting a capacitor in series with the crystal raises the frequency of oscillation. For a crystal to operate at its specified frequency, the electronic circuit has to be exactly that specified by the crystal manufacturer. Note that these points imply a subtlety concerning crystal oscillators in this frequency range: the crystal does not usually oscillate at precisely either of its resonant frequencies.

Crystals above 30 MHz (up to >200 MHz) are generally operated at series resonance where the impedance appears at its minimum and equal to the series resistance. For these crystals the series resistance is specified (<100Ω) instead of the parallel capacitance. To reach higher frequencies, a crystal can be made to vibrate at one of its overtone modes, which occur near multiples of the fundamental resonant frequency. Only odd numbered overtones are used. Such a crystal is referred to as a 3rd, 5th, or even 7th overtone crystal. To accomplish this, the oscillator circuit may include additional LC circuits to select the desired overtone.

Crystal oscillators may experience frequency drift over time. Thus, the system may include a frequency correction circuit to compensate for this frequency drift. The frequency modulation circuit may include an ability to detect the incoming signal, and provide data on the frequency of the incoming signal to a processor. The processor may be connected to a memory which stores data on an expected frequency for the signal, and instructions which may be executed on the processor to control the frequency modulation circuit to modulate the incoming signal either up or down to match the expected frequency if the incoming signal is not at the expected frequency. The frequency modulation circuit may extend the operable life of the quartz crystal oscillator by compensating for the expected eventual frequency drift.

Figure 2B:
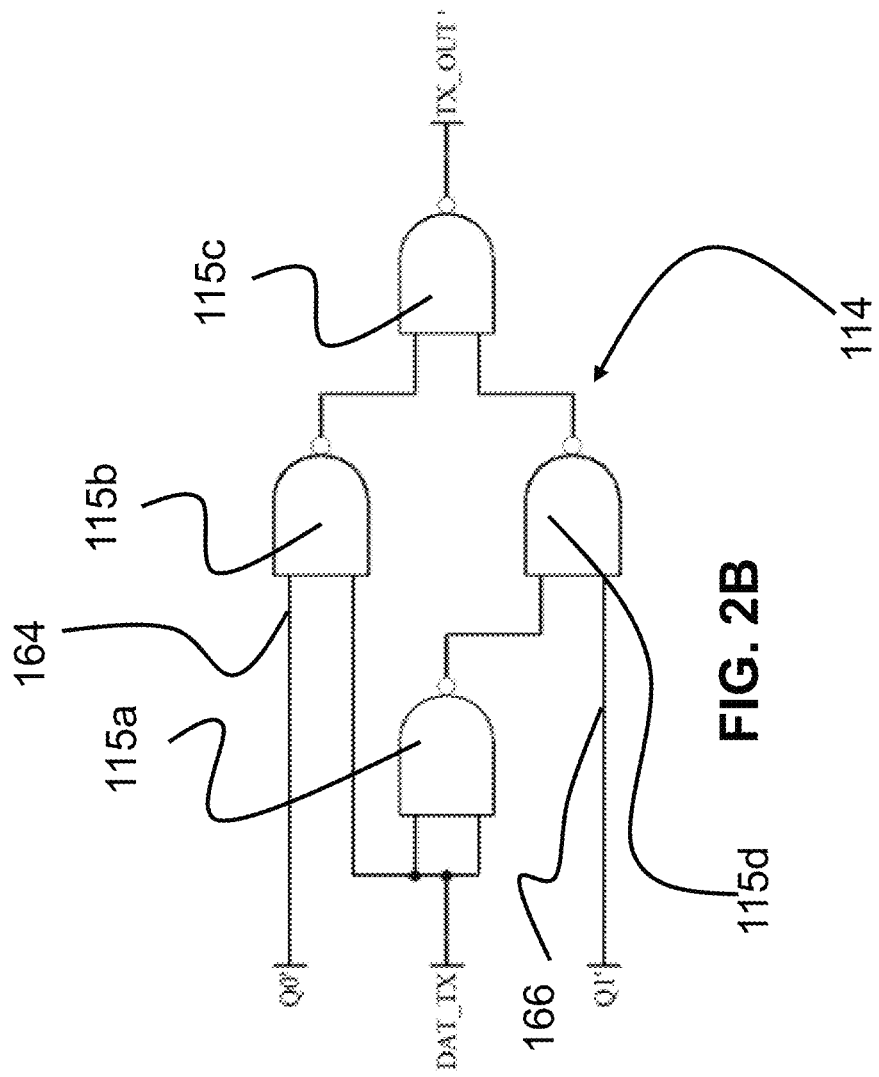
FIG. 2B shows a circuit diagram of one embodiment of the switch.

As shown in FIGS. 1, 2A, and 2B, a signal from the first crystal oscillator circuit 111 is routed to an integrated circuit 162. Between the first crystal oscillator circuit 111 and the integrated circuit 162, the signal may be split to create two signals. The signal may be split at a location between the crystal oscillator circuit and the integrated circuit 162. As shown in FIG. 2A, the crystal oscillator circuit may be a complimentary metal oxide semiconductor (CMOS) crystal oscillator circuit. Alternatively, the crystal oscillator circuit may be an alternate type of oscillator circuit, with oscillator circuits which operate in series resonance being preferred. The split signal may be input, each on a separate pin, to the integrated circuit 162. As shown in exemplary embodiment of FIG. 2A, the signal is input to the integrated circuit 162 on two pins, pin A and pin B. The integrated circuit 162 may include a phase shift sub-circuit 116 to phase shift one of the input signals. It will be easily recognized by those of ordinary skill in the art that the integrated circuit 162 may include a plurality of phase shift sub-circuits in order to create a plurality of phase shifted signals from at least one of the two input signals. At least one of the two split signals input from the first crystal oscillator circuit to the integrated circuit 162 may pass through the integrated circuit 162 without modification to the amplitude, frequency, or phase of the signal. Moreover, all of the signals, including those that are phase shifted, retain the same frequency.

The signals input on pin A may have a different signal path from the signal input on pin B. For example, the signal input on pin B may pass through a phase shift circuit, and the signal input on pin A passed without passing through a phase shift circuit. Alternatively, the signal from pin A may be phase shifted, and the signal input on pin B may pass without the phase being changed. The integrated circuit 162 may phase shift the second signal many times. For example, using the clock signal of 16 MHz to index the timing of the phase shifts of the 1 MHz signal, the signal may be phase shifted as many as 15 times. This is because 16/1=16. That is, there are 16 possible phase states, or the original state and 15 shifted states in each cycle of the 1 MHz signal which are indexed by the 16 MHz clock signal. The 16 MHz clock signal is produced by a 16 MHz crystal oscillator circuit 160, and input to the clock pin of the integrated circuit 162. Thus, each of the 15 phase shifted signals may be shifted by 22.5 degrees because 360/16=22.5. As discussed above, the frequency oscillation of a crystal oscillator is very stable and accurate. The phase shifting circuit of the present disclosure makes use of this stability and accuracy of the clock frequency crystal oscillator, which is 16 MHz in the above example, as a tool in phase shifting. Because the phase shift circuit indexes the phase shift based on the stable and accurate frequency of the clock crystal oscillator, the phase shifts of the transmission frequency signal are very precise. This precision provides the potential for the use of multiple phase states to create higher data rates.

As discussed above, there may be up to 16 different phase states in the exemplary embodiment. Depending on the crystals used, there may be more than 16 or less than 16 possible phase states. Each of the phase states may be assigned to represent one of two binary states, that is, one or zero. While these phase states may be produced, the system may choose to utilize less than all the phase states that are produced. In the simplest embodiment, the system may use just the unaltered signal and one phase shifted signal.

The phase shifted signal may then be routed to one terminal of a switch 114. As shown in FIG. 2B, the switch 114 may be a combination of logic gates 115a-d, for example not/and (NAND) gates, a fast switching operation, as is well known in the art, or any other switch which is able to provide fast enough switching, including transistors which may act as switches by having a voltage applied to, and then disconnected from, the base of the transistor. The switch may have the general effect equivalent to that of a single pole, dual throw, or SPDT switch. The first of the two incoming signals from the first crystal oscillator may be connected to a first terminal 164 of the switch 114. The second of the two incoming signals from the one or more crystal oscillators may be connected to a second terminal 166 of the switch 114. The output may be connected to the common of the switch 114. The speed of the switch 114 allows for very rapid alternation between the first signal and the phase shifted second signal. By way of example and not limitation, the switch 114 may cycle fast enough to switch 10 times from the first signal to the second signal and back to the first signal in a single cycle of a 40 MHz signal. Thus, there is an opportunity, depending on the protocol used by the system, to send 10 bits of information in a single 40 MHz cycle, all without interference by noise. In this example, the system could generate 400 million bits of information a second on a bandwidth of a single frequency. Alternatively, the switch may cycle fewer than 10 times in a 40 MHz cycle, or more than 10 times in a 40 MHz cycle. Still further alternatively, the crystal oscillator may generate a sinusoidal wave at more than 40 MHz or less than 40 MHz. The operation of the system, including the creation and switching between the sinusoidal waves produced by the crystal oscillators is discussed in great detail below. The transmission portion 106 is electrically connected to a transceiver output 120, which is in turn connected to the power line 112. It will be apparent to one of ordinary skill in the art that the components of the switch may be expanded to allow for the formation of a control signal with any plurality of phase states. While the example shown includes only two logic gates for the passage of the signals to two phase states, one of ordinary skill in the art will recognize that the exemplary configuration of FIG. 2B can be expanded to accommodate many more phase states. For example, even 100 or more phase states may be possible. When designing an embodiment for a plurality of phase states to encode information on a control signal, a balance may be struck between the frequency of the transmission signal and the number of phase states. For example, when lower frequencies are used, more phase states may be used, and when higher frequencies are used, fewer phase states may be used. This is only a general rule, and other factors may cause exceptions.

Figure 2C:
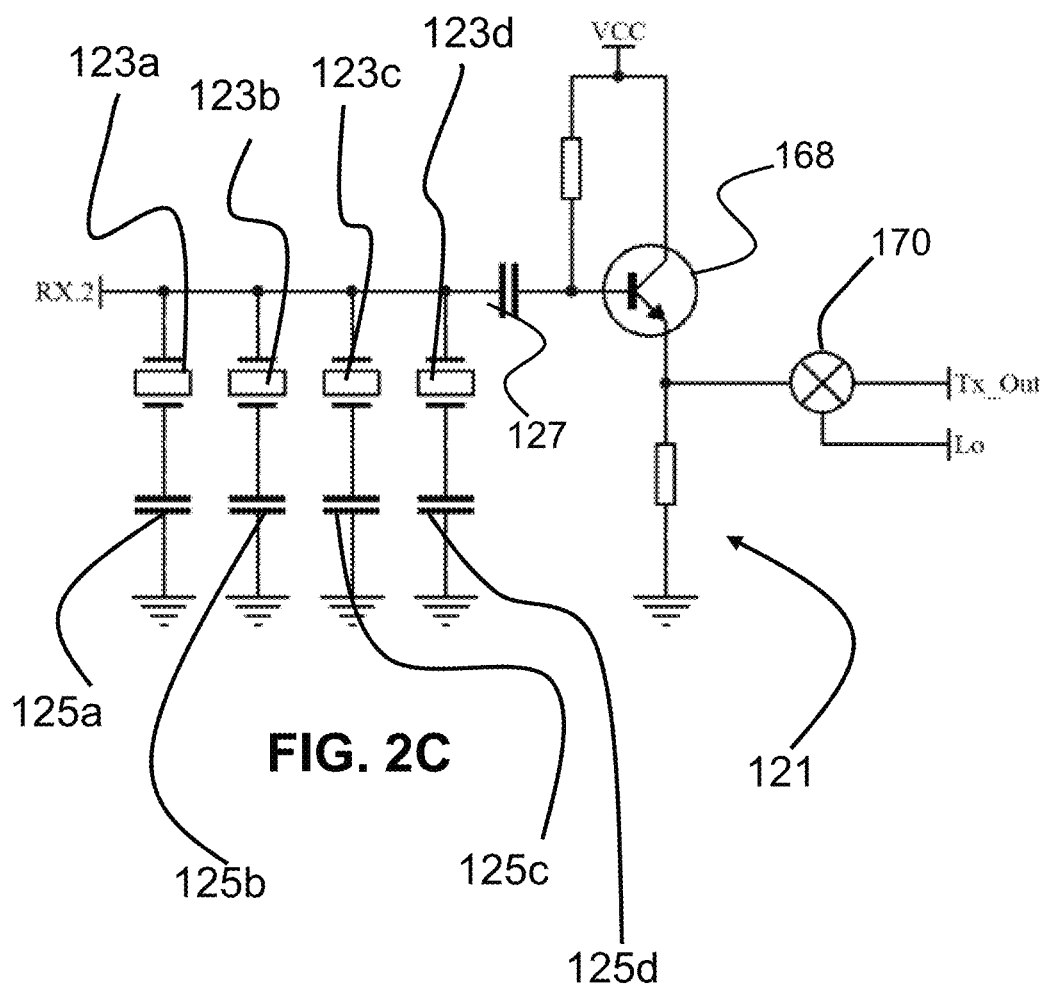
FIG. 2C shows a circuit diagram of one embodiment of a sub-circuit which strips harmonics from the signal output by the switch.

As shown in FIG. 2C, before the control signal is transmitted, the control signal may be routed through a harmonic elimination and frequency mixing circuit 121. The circuit may include a plurality of crystal oscillators 123*a*, 123*b*, 123*c*, 123*d* and capacitors 125*a*, 125*b*, 125*c*, 125*d* in parallel. The control signal passes through one capacitor 127 in series, and then through a transistor 168. Finally, the control signal passes through a signal lamp 170 and is output.

The transceiver 104 may include a memory 122 on which a protocol is stored, and a processor 124 which is electrically connected to the memory, and on which the protocol is executed. The protocol may include a portion which interprets commands sent by the controller 102, or from a transceiver 126*a-i* in a device 130*a-h* or a sensor 131*a*. The protocol, executed by the processor 124, accomplishes the encoding of the output of the crystal oscillator circuit by controlling the switch 114 through a baseband signal.

The protocol is designed so that control signals include an identifier as to which device 130*a-h* or sensor 131*a*, 131*b* the message is directed. If a message is not directed to a particular device 130*a-h* or sensor 131*a*, 131*b*, that device or sensor ignores the message.

The power line 112 may carry standard North American domestic power. That is, 120 V nominal, 60 Hz electrical power. As noted previously, the power line may have electronic noise on it from one or more sources. Alternatively, the voltage may be more than 120V or less than 120V. Further alternatively, the frequency of the power signal may be greater than 60 Hz or less than 60 Hz.

The power line may be carrying single phase or three phase power. If one or more of the three phase conductors are split to provide single phase operation, the disclosed system will still function, because the output routes the control signal to each of the conductor wires on a three-phase system, rather than selectively choosing just one.

One or more devices 130*a-h* or one or more sensors 131*a*, 131*b*, or both, may be connected to the power line 112. In FIG. 1, 8 devices 130*a-h* are shown, but it will be understood that there could be fewer than 8 devices, or more than 8 devices. The devices 130*a-h* include a plug (not shown) for connecting the device 130*a-h* to a conventional outlet socket 132*a-h* on a conventional outlet. The conventional outlet 132*a-h* is electrically connected to the power line 112. The devices 130*a-h* further include a transceiver 126*a-c*, and 126*e-i* to receive the control signal from the transceiver 104 or a sensor 131*a* and 131*b* when a sensor is not integrated with the device, as is the case with sensor 131*b* and device 130*e*, a processor for executing the protocol, a memory for storing the protocol, and a transmitter for sending both self-identification information, and acknowledgment messages to the transceiver, and a transformer which takes power from the power line for powering the temperature sensor, transceiver and the memory and processor which executes the protocol.

Figure 3B:
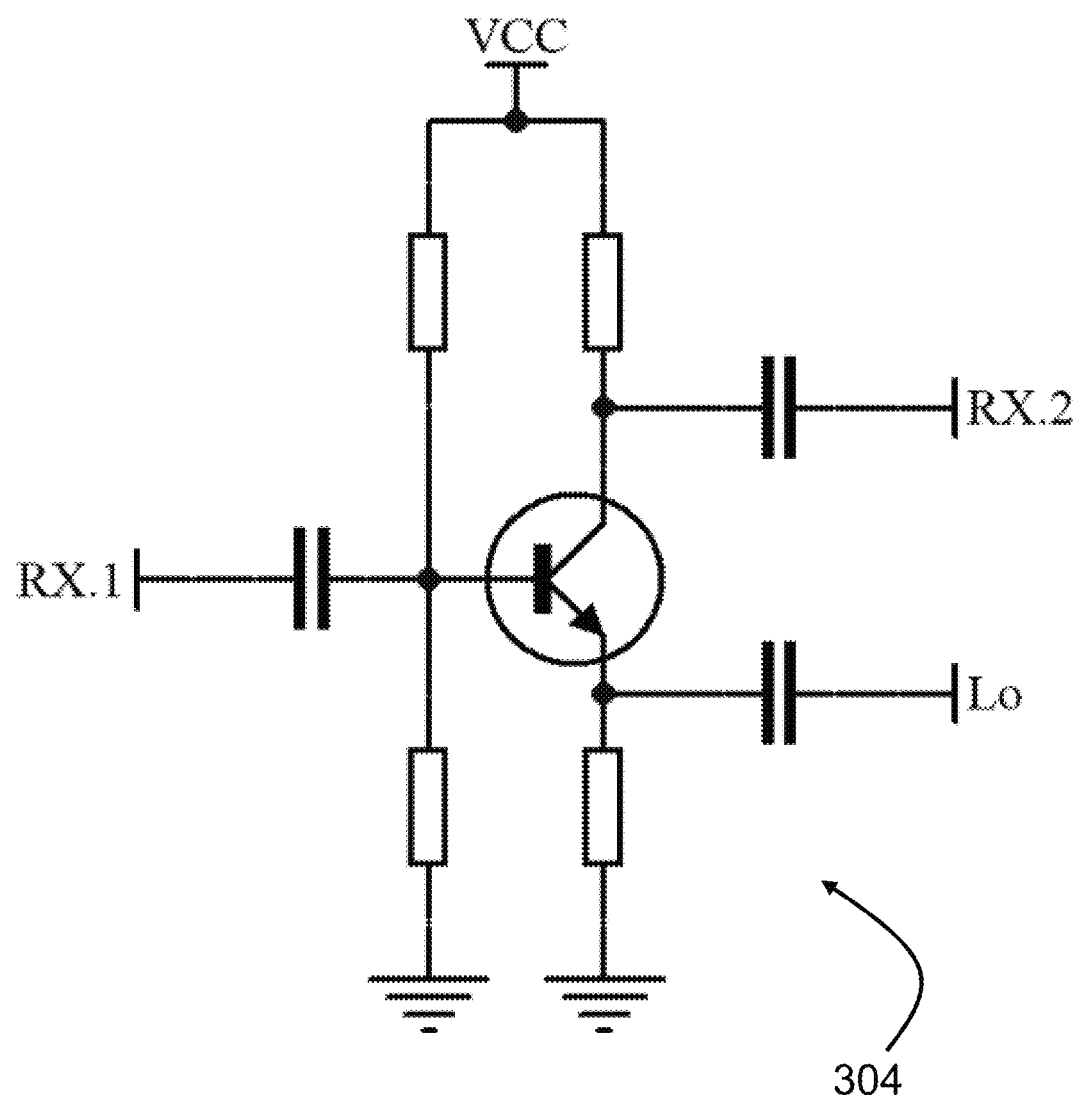
FIG. 3B shows a circuit diagram of the amplifier and mixer portion of the receiver of the transceiver.
Figure 3C:
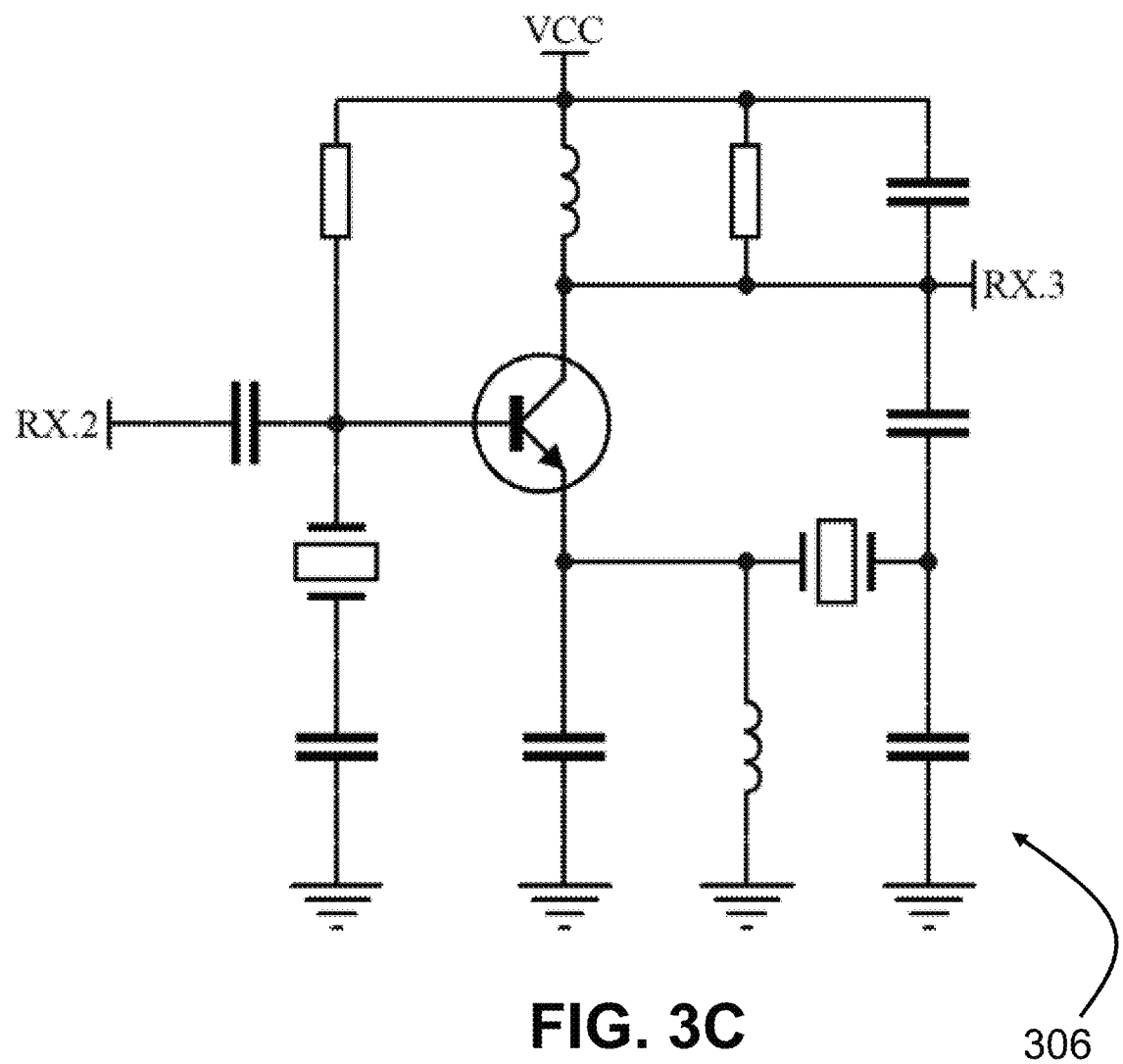
FIG. 3C shows a circuit diagram of the ultra narrow band filter of the receiver.
Figure 3D:
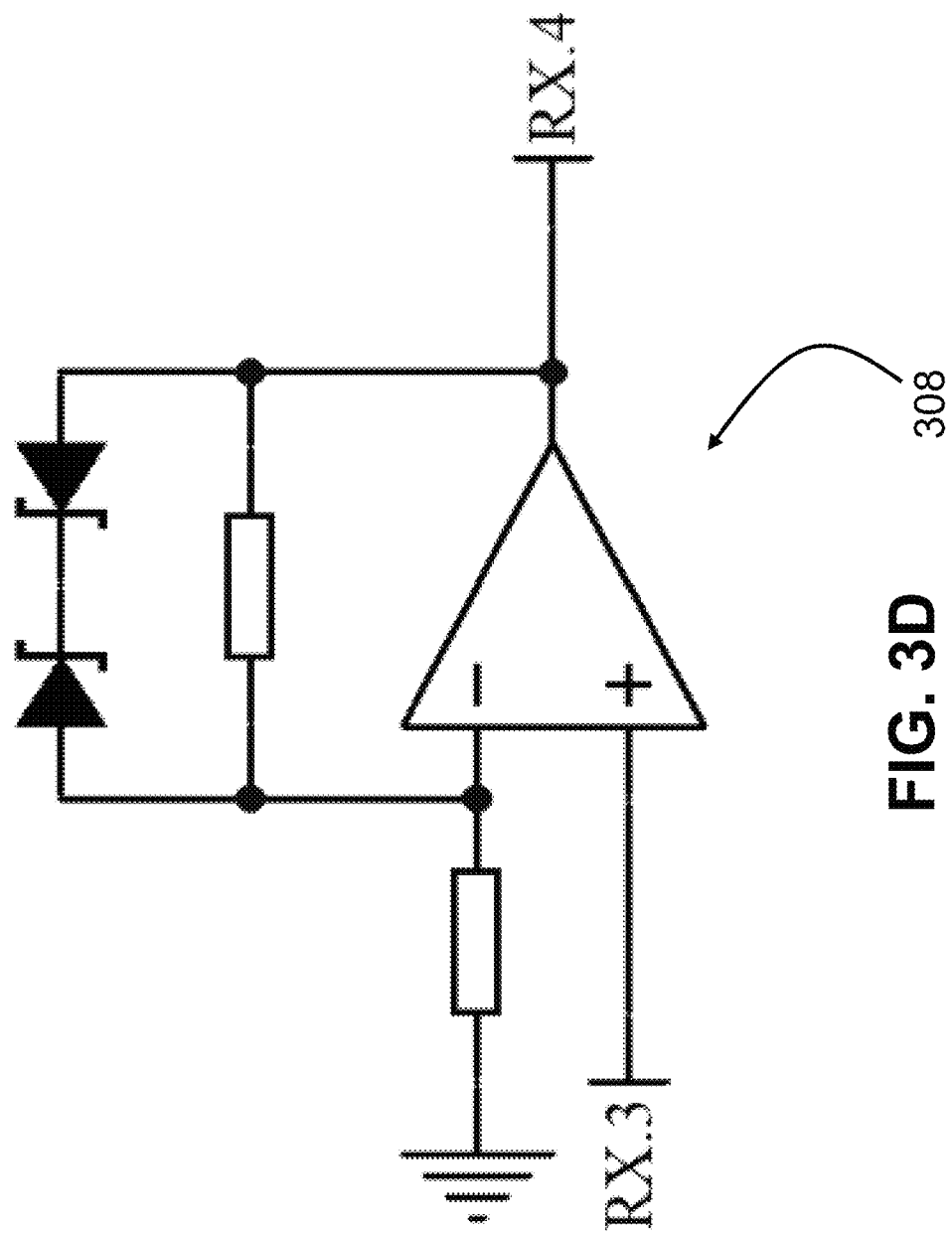
FIG. 3D shows a circuit diagram of the amplitude limiting sub-circuit of the receiver.
Figure 3E:
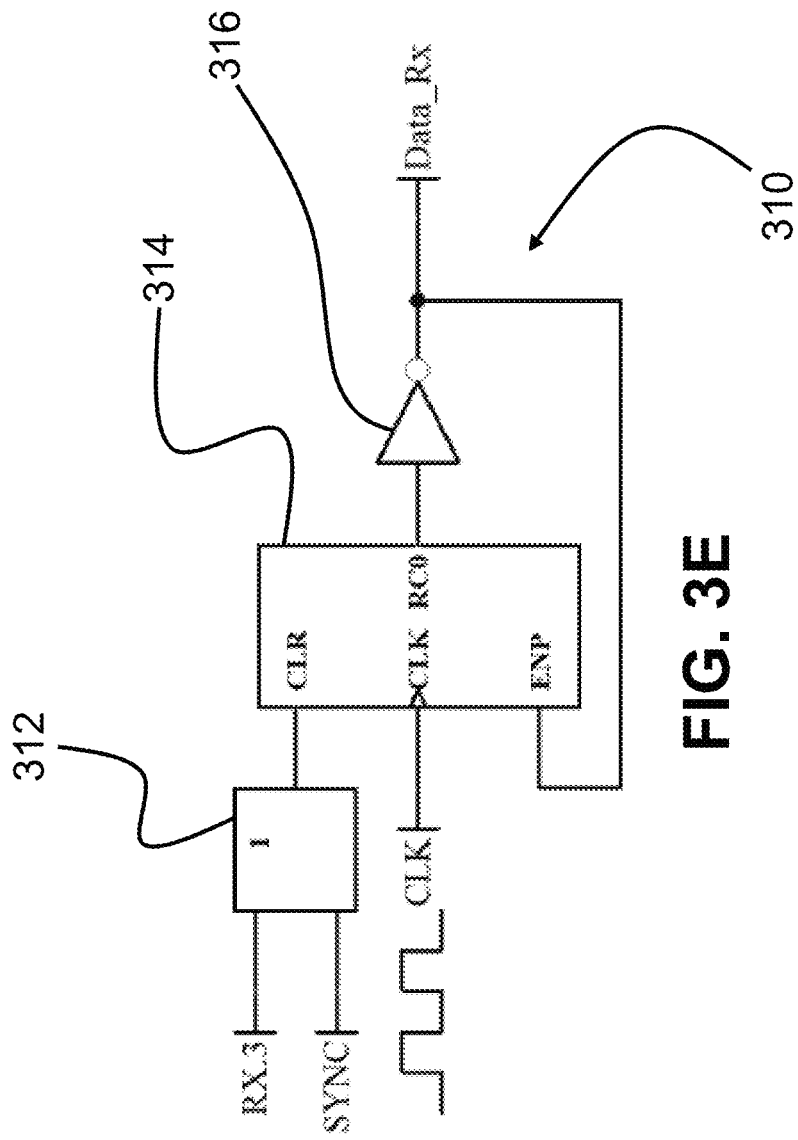
FIG. 3E shows a circuit diagram of the baseband decoding sub-circuit of the receiver.

As shown in FIGS. 1, and 3A-3E, the transceiver 126*a-i* in the devices 130*a-h* and sensor 131*a* includes a receiver. The receiver includes a plurality of sub-circuits. As shown in FIG. 3A, a received control signal may first pass through a high frequency amplification sub-circuit 302 of the receiver. As shown in FIG. 3B, a mixing and amplification sub-circuit 304 may be connected to the high frequency amplification sub-circuit 302. As shown in FIG. 3C, connected to the mixing and amplification sub-circuit 304 is an ultra narrow band filter 306. The ultra narrow band filter 306 passes a very narrow band of frequencies, for example, 10 Hz. Just as with the crystal oscillator in the transceiver 104 and transceivers 126*a-i*, the crystal in the ultra narrow band filter 306 has a very high Q factor. The crystal's stability and its high Q factor allow ultra narrow band filters 306 to have precise center frequencies and steep band-pass characteristics. Thus, the ultra narrow band filter only captures frequencies in an ultra-narrow band centered on the frequency produced by the crystal oscillator circuit 110 and does not allow the rest of the signal on the power line to pass to the transceiver. Thus, the power signal on the power line may be routed to other components in the device to provide power, with the power signal being substantially unaffected. As shown in FIG. 3D, the ultra narrow band filter 306 is connected to an amplitude limiting sub-circuit 308. A control signal passing through the amplitude limiting sub-circuit has the amplitude controlled because too high amplitude in the control signal can cause distortion in the control signal when the control signal is decoded. As shown in FIG. 3E, the amplitude limiting sub-circuit 308 may be connected to a baseband decoding sub-circuit 310. As explained in further detail below, in the baseband decoder sub-circuit 310 may receive the analog signal with varying phase states, and the protocol may be used to measure the phase states against a clock signal as a standard or index. The baseband decoding sub-circuit 310 uses one or more integrated circuits 312, 314 to convert the control signal in to a binary baseband signal. After conversion, the decoded baseband signal is amplified by an operational amplifier 316 and output.

This configuration of the crystal oscillator in the transceiver 104 and crystal filter in the transceiver 126*a-i* of the device 130*a-h* plays a large role in eliminating noise. In some systems, noise has been a problem which prohibits the use of PLC. Solutions to the electrical noise problem have been proposed, but all are either burdensome, or costly, or both. For example, a broadband filter may be added to the system to filter out the noise, but the equipment is expensive and bulky, and often required to be wired to a structure's electrical panel. Such solutions merely place post installation band aids on the problem.

The disclosed system does not suffer from electronic noise interfering with the control signal for several reasons. First, the frequency at which the configuration operates is relatively high as compared to the power signal on the power line. In the case that the noise does reach the frequency of the control signal, the noise would have to be equal to, the power of the control signal to compete in the ultra-narrow bandwidth. The ultra-narrow bandwidth is another aspect of the system which provides robustness against noise. The electronic noise would have to be found within the bandwidth, which, were the bandwidth relatively wide, would be likely. However, with the bandwidth so narrow, it is relatively unlikely that electronic noise will be found within the ultra-narrow bandwidth. Moreover, for example, with a one-watt transmission power spread across a very small bandwidth, which may be even a single frequency, the control signal can compete with, if not outright overmatch, most noise. Also, the noise would have to be in phase with both of the crystal oscillator-produced signals. Even if the noise were to be at the same frequency and have the same power as the crystal oscillator produced signals, the control signal may be detectable within the noise unless the noise includes both of the phase states of the control signal. It is extremely unlikely that the noise will include both phase states or change phase as rapidly as the control signal.

Another benefit of the disclosed system and method is the distance over which the control signals of the disclosed system can be transmitted. Because the energy of the control signal is spread across a much narrower bandwidth than typical electromagnetic signals conveying control information, the control signal does not suffer from attenuation in the way that a broader bandwidth signal with the same energy would. As a result, the signal travels over a longer distance than a similarly powered signal with a greater bandwidth. As with most other electrical signals, lower frequency signals travel farther.

Such a transceiver 104, device 130$a$-$h$, and sensor 131$a$ and 131$b$ configuration has still further advantages. Because the system 100 operates on such a narrow bandwidth, the system does not interfere with other devices or systems. Moreover, because of the signal's placement in the spectrum, there are very few devices with which the system 100 can interfere. Thus, the system 100 is not only able to deal with the worst noise found on most power lines 112 but is further able to avoid interfering with other systems because the system 100 operates on an ultra-narrow bandwidth.

Sensors, for example, sensor 131$b$, may be integrated with each of the devices. When integrated, the sensor may share the device's transceiver 126$f$ with the device. Alternatively, the device and sensor may share a transceiver, memory and processor. Still further alternatively, the device and the sensor may each have a dedicated transceiver, memory, and processor. Thus, during operation, all commands may be sent directly to the device and stored in the device's memory for processing by the protocol on the processor, and accessed by the device or sensor, or both.

Alternatively, the sensors may be separate, but electrically connected to the device. Depending on the configuration and characteristics of the device, the device may interfere with the data taking function of the sensor, necessitating physical separation. Moving the sensor away from the device may allow for more accurate or effect data taking, or both more accurate and effective data taking.

The sensor may be a component separate from the device. The sensor may be connected to the powerline. The memory electrically connected to the sensor may store parameters sent by the controller for a corresponding set of commands already saved to a memory of the sensor. The sensor unit may include a power supply which includes a plug to connect to an outlet socket in order to send and receive control signals. The plug also allows the sensor unit to receive a power signal. The power supply may include transformers to decrease the incoming voltage to properly power the components of the temperature sensor unit.

When the sensor is separate from the device, each sensor includes a transceiver identical to that of the transceiver operating in conjunction with the controller. The sensor may include instructions stored in a memory on the sensor which may have certain parameters of commands set by the controller. For example, the controller may set a particular temperature as a parameter. Based on the temperature, there may be a command to dim the device, for example, a light fixture, or at a different and higher temperature, to turn the light fixture off. The control signal is generated by the sensor, for example, a temperature sensor, in the same manner as a control signal is generated by the controller, except the commands are drawn from a predetermined list of commands stored on the memory of the sensor, and triggered by conditions detected by the sensor. For example, a temperature sensor may have a command to turn off a device, specifically a light fixture, if a temperature of 95 degrees Fahrenheit is detected by the sensor. Thus, rather than the commands being determined manually, the commands are determined autonomously based on predetermined conditions.

It may also be the case that a system, which may include light fixtures among multiple kinds of devices, uses a combination of the above sensor configurations, which may be, for example, a sensor for temperature alone, or may be a combination sensor which includes a temperature sensor among several kinds of sensors which can detect several kinds of data. That is, some light fixtures may have a temperature sensor integrated with the light portion, other light fixtures on the system may have a temperature sensor integrated with the ballast, and still other light fixtures may be controlled by a separate temperature sensor as an individual component of the system.

Regardless of whether a single type of device and sensor arrangement is used, or a combination of types of device and sensor arrangements are used, all of the device and sensor arrangements are directed to achieving the purpose of decentralization of sensing and control. As described above, prior art systems all have centralized sensing and control. With as much as one sensor for every device, much more precise control can be achieved because the sensor may provide localized control for the device in a closed loop fashion, completely apart from the control provided by the main controller.

The disclosed PLC system may operate as a hybrid system. That is the PLC system may simultaneously operate as both an open loop system with portions of subsystems operating as a closed loop system. Any device may be controlled both by the controller in open loop, and by the assigned sensor, if any, in closed loop. It should be noted, however, that the protocol is designed such that the controller and sensors do not send the same commands at the same time. Rather, control may be split between the two depending on which of the controller and sensor is best positioned to issue the command.

The disclosed system, both because of the method of control, and because of the physical arrangement of the components of the system, offers considerable robustness against failures. A device in the disclosed system will continue to function under the control of both, or either, of the controller and the assigned sensor should any other device in the system cease functioning. Depending on the location and type of failure in a pure open loop system, the entire system may cease functioning. Further, if the sensor is integrated in to the device, even multiple failures elsewhere in the system may not affect the flow of commands from the sensor to the device. Even if the sensor is a separate component, there may be a very short distance of powerline between the device and the sensor. The copper wire of the powerline on which the signals are carried has very low failure rates, making a failure of the wire between a sensor and a device highly unlikely. Thus, even with a longer span of wire between the controller and any devices than there may be between a sensor and a device, failures of the wire are very unlikely. Because the commands may be sent from either the sensor or the controller, total failure of the system is highly unlikely. Even in the event of the failure of the controller or an individual sensor, the controller or other sensors will still operate devices assigned to those sensors. Almost all sensors also have extremely low failure rates, making the most likely source of failure the controller. However, failures of the controller are easier to detect than any other failure on the system, for reasons explained below. This lowers the risk of the operation of the system.

As noted above, the transceiver 104 includes both a transmitter 106, and a receiver 108. The transmitter 106 includes the combination of the crystal oscillation circuit 110, and the switch 114. The receiver 108 of the transceiver 104 is the same as the receiver 126a-i described for the devices 130a-h and the sensor 131a. Further, the transmitter integrated with device and sensor transceivers 126a-i is the same as the transmitter 106 described for the transceiver 104 operating in conjunction with the controller. The transceiver 126a-i on the devices 130a-h and sensor 131a may be used to send acknowledgements of commands sent to the devices 130a-h and sensors 131a, 131b back to the transceiver 104. The receiver 108 on the transceiver 104 may be used to receive identification information from the devices 130a-h and sensors 131a, 131b which are electrically connected to the transceiver 104, the controller 102, or both. Further, the receiver 108 on the transceiver 104 may be used to receive the acknowledgements from the devices 130a-h and sensors 131a, 131b. For example, when a sensor 131a is a component of the system separate from a device, the sensor 131a may include a transceiver 126d. The transceiver of the sensor is identical to that of the transceiver operating in conjunction with the controller and the transceiver integration with a device.

In operation, the system may function in two distinct modes, but the modes may operate in parallel, or contemporaneously. The first mode may be characterized by control signals being sent exclusively from the controller. The second mode may be characterized by essentially autonomous control of the devices by the system's sensors, and secondarily, autonomous control signals from the controller. That is, it is possible that the controller and the sensors may send control signals contemporaneously, or even almost simultaneously. The two modes are primarily distinguished by user control in the case of signals from the controller and autonomous control based on predetermined parameters stored in the sensors and controller. In the case of the first mode, after the controller 102 is powered up, woken up from sleep mode, or connected via a wired or wireless connection to the transceiver 104, the controller 102 may interrogate the devices 130a-h and sensors 131a, 131b electrically connected to the power line 112. This is done by the controller 102 sending a command to the devices 130a-h and sensors 131a, 131b to respond to the command with identification information. If a controller 102 is already connected, the protocol may require that a device 130a-h or sensor 131a, 131b which is later connected to the system 100 send self-identification information to the controller 102.

Because the controller 102 is able to identify each device 130a-h or sensor 131a, 131b, or combination thereof, connected to the controller 102 individually, future commands may be specified as being for a particular device 130a-d, 130f-h or separate sensor 131a or combination device/sensor 130e/131b. Because these commands contain information identifying the device 130a-d, 130f-h or separate sensor 131a, or combination device/sensor 130e/131b to which they are directed, the commands will be ignored by other devices or sensors, or combination device/sensor. Alternatively, some or all of the devices 130a-d, 130f-h or separate sensors 131a, or combination device/sensor 130e/131b could be specified by a command. Thus, groups of devices, for example, a group of light fixtures in a specified area of a structure, may be controlled as a group. Alternatively, the separate sensors may be controlled as a group apart from the devices, or vice versa. Or, if, for example, all devices and separate sensors need to be powered down, this can also be accomplished through the above identification of all devices 130a-h and separate sensors 131a, or combinations thereof. In fact, there may be a particular identifier in the protocol specifying that a command is for all components of the system, including devices 130a-h, separate sensors 131a, and combinations thereof. Such an identifier prevents the protocol from requiring that each device 130a-h and sensor 131a, if any are separate components, have an individual identifier separately listed in a command.

In order to send commands to one or more devices 130a-h with integrated sensors, or to separate sensors operating in mode one, commands from the controller 102 are converted to control signals by the protocol. The control signal has two parts. The first part is a first sinusoidal wave, which is generated continuously by one or more crystals in one or more crystal oscillation circuits, as shown in Step 410 on FIG. 4. The second part is a second sinusoidal wave which is generated either by the same one or more crystal oscillation circuits or another of the one or more crystal oscillation circuits. This second sinusoidal wave is then phase shifted so it is out of phase with the first sinusoidal wave. The two sinusoidal waves may be out of phase, for example, by 22.5 degrees. Alternatively, the first sinusoidal wave and the second sinusoidal wave may be out of phase by as less than 22.5 degrees or more than 22.5 degrees. As shown in FIG. 5, the non-phase shifted sinusoidal wave 510, and the phase shifted sinusoidal wave 512, are electronically routed to a switch. Using the switch controlled by the protocol, control information may be encoded on an output signal. The information may be encoded by creating an output wave which alternates between the first sinusoidal wave and second sinusoidal wave according to a baseband signal which is input to the switch 114 from a processor. The output of the switch 114, which is shown in Step 420 of FIG. 4, includes portions of the two signals which are in two different phases. The portions may be in series. Thus, the first sinusoidal wave may form a section of the control signal, and be followed by a section formed by the second sinusoidal wave, and vice versa. Alternatively, as is discussed above, there may be a plurality of phase states, for example, 16. Each of the phase states may be assigned to represent one of the two binary states, and in the exemplary embodiment of 16, provide 16 bits of data per cycle of the transmission frequency. After generation, each of the sinusoidal waves may be fed to the connected switch 114, as is described above. The switch 114 is also connected to a processor 124 which executes the protocol. Based on the command signals from the controller, which are converted by the processor to a baseband signal using the protocol, the processor 124, using the baseband signal, directs the switch 114 to switch between the first sinusoidal wave and the second sinusoidal wave. Information is encoded on the output sinusoidal waveform by varying the timing between the first sinusoidal wave and the second sinusoidal wave from the crystal oscillator circuit 110 by switching the switch 114 from the first signal to the second, phase shifted signal and back to the first signal, and back again, in order to encode the information carried by the baseband signal. The phase shifting allows one of the signals, or sinusoidal wave, to represent a first binary state, for example zero. The second signal, or sinusoidal wave, may represent a second binary state, for example one, or vice versa. The spacing of portions of the wave having a certain phase may represent control information as well. For example, if a portion of the output signal is twice as long as another portion, the first portion may represent two of the first binary states in a row. All of the above encoding may be decoded by the protocol when the output signal is received by the receiver. The output wave including the control information may be called a control signal.

As discussed above, the timing for the portions of a signal of a certain phase may be set to a fractional portion of the wave cycle of the crystal oscillator frequency by the protocol. For example, the control signal may be timed so that a portion of the signal is never any less than a full cycle. Thus, where a signal of a first phase 510 appears on the output wave, the protocol may interpret the first phase 510 as indicative of a first binary state, while uninterrupted, addition cycles representing additional instances of the same binary state. When the output wave changes phase to a second binary state 512, a cycle of the second phase may be indicative of a second binary state. In this embodiment of the encoding one phase is assigned a binary state, and always indicates that binary state.

Alternatively, a change in phase may represent a first binary state, while no change in phase from, for example, cycle to cycle, represents another binary state. It is contemplated that the phase may change more often than a single cycle, and less often than a single cycle. It is the change of cycle, or, as in the previous embodiment, the presence of a certain phase that is indicative of the binary states. Single cycles are used as examples herein to make the operation of the system easier to understand, but one of ordinary skill will instantly recognize that there is no requirement to use whole cycles for operation of the system. In this second embodiment, a change is indicative of a first binary state. Thus, after a first cycle, the phase may change. The change may be indicative of a binary state, for example one. The phase remains unchanged for another cycle. This lack of change may be indicative of a second binary state, for example, zero. Thus, two different phase states may seem to represent different binary states, but, in reality, it is the presence or absence of change between phases that represent the different binary states.

In either of the above protocol definitions, the protocol may interpret the control signal as a series of binary states, with the binary states representing either a one or a zero. Commands may be defined by the protocol from differing sequences of ones and zeros, or binary sequences.

Sequences of ones and zeros may form data or commands that can be analyzed and converted by the protocol. Therefore, the sequences of ones and zeros may be said to form a baseband signal. As an example, the devices and separate sensors may identify themselves using a binary code of a set number of digits. The identification may be a shorter or longer sequence than those of the commands. The protocol may define a preliminary indicator which indicates the start of a command or data string, and a second indicator which indicates the command or data send is complete and requests that the device or sensors to which the command was directed send an acknowledgement to the controller. Similarly, the protocol may use binary sequences to define commands. Each of these may be included in the baseband signal. By way of example and not limitation, the protocol may define that "1001" may correspond to a command to turn a device 130a-k, to 100% of any adjustable range. For example, if the device is a light, that means turning on the light to max brightness, or if the device is a fan, turning that fan on to max revolutions per minute. A control signal of "1000" may correspond to a command to turn the device 130a-k off. The data and commands may be packaged as messages that include the preliminary indicator that a command or data follows, headers which identify to which fans the command is directed, the command, and an indicator that the command is complete and a request for acknowledgement of the command by the device or sensor.

It is important to note that when the first sinusoidal wave and second sinusoidal wave are combined in serial segments to create the control signal, the frequency of the first and second sinusoidal waves are unaffected. That is, the frequency of the control signal is that same as that of the first sinusoidal wave and second sinusoidal wave. Rather, only the phase changes within the control signal when the first sinusoidal wave and second sinusoidal wave are combined in segments to create the control signal. Thus, the control signal is output to the power line with the frequency unaffected.

Figure 4:
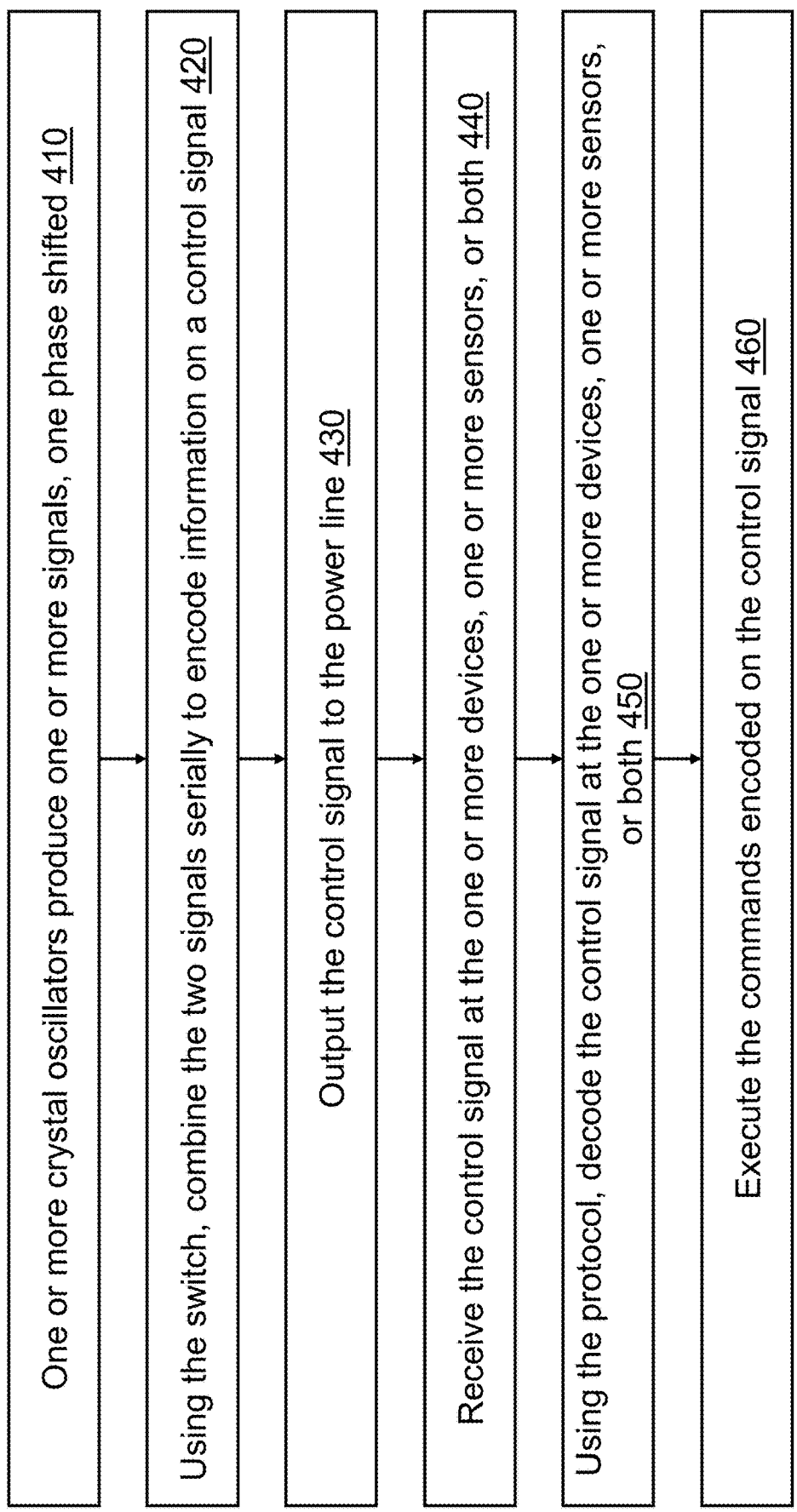
FIG. 4 shows a flowchart of a method of providing power line communication.
Figure 5:
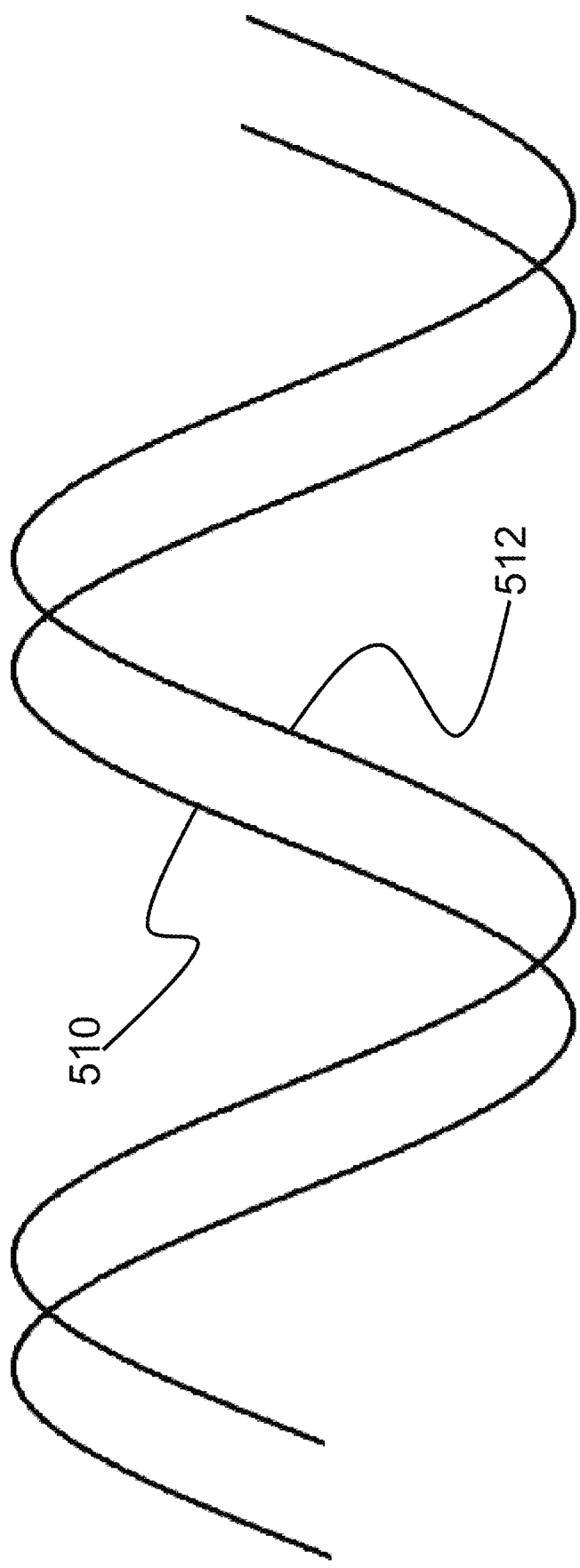
FIG. 5 shows a diagram of the two crystal oscillator waves at the switch.
Figure 6:
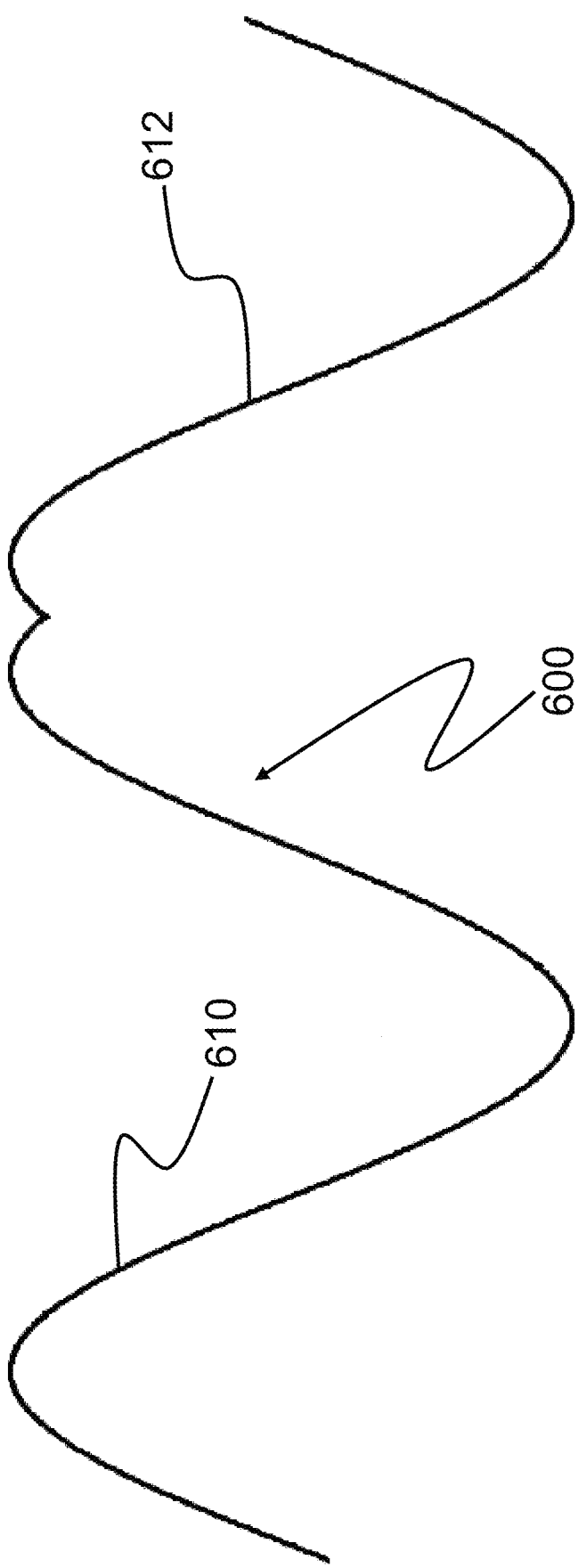
FIG. 6 shows one embodiment of a detection method at the receiver.

Once the control information is encoded by using the switch to alternate the sinusoidal waves generated by the crystal oscillator circuit 110, the control signal is output to the power line 112 as is shown in Step 430 of FIG. 4. The output is a broadcast throughout the power line 112. An exemplary control signal 150 is shown in FIG. 6. The control signal 600 includes a plurality of phases 610, 612. It will be noted that the segments of differing phases 610, 612 are placed at protocol-defined intervals along the control signal 600, rather than one phase change after another with no space in between, which would make detection extremely difficult with current detector technology, although such spacing is still theoretically possible.

Alternatively, the transceiver may include additional circuitry which may either be bypassed or may receive an output of the signal of the transmission crystal oscillator. This circuitry may be configured to amplify a harmonic frequency of the signal output by the transmission crystal oscillator. For example, the harmonic may be an order of magnitude higher in frequency than the resonant frequency of the transmission crystal oscillator. Other harmonics and the primary frequency may then be stripped from the signal. This amplified and higher frequency signal may then be split and encoded as described above. Further, the smart device or controller may have a setting which indicates which devices and which sensors are close and which are at a distance. The higher frequency may be used for faster response and higher data rates where possible, and the lower frequency signal may be used for devices and sensors which are out of range of the higher frequency transmission, ensuring the control signal is received by the devices and sensors at a greater distance.

Start up control signals may be sent using mode one operation by the controller, and may include power on signals for designated devices. The power on signals may be refined predetermined modifications. For example, in the case of a device with a range of settings, for example, a light, the predetermined modification may ramp up the brightness of the light produced by the light fixtures during power on. The same may be done during power off by including a predetermined modification ramping down the brightness of each light fixture during power off. Ramping up and ramping down may use the dimming function of the lights to gradually power them on from a lower brightness to a greater brightness, and gradually power the lights down from a greater brightness to a lower brightness, and then off. These predetermined modifications may be of great benefit when the lighting system is used for indoor agriculture, because the ramping simulates sunrise and sunsets, allowing the lighted crops to receive the same type of light they would if the crops were in an outdoor environment. Alternatively, all of the above control signals may come from the controller during both mode one and mode two of the operation of the system.

Commands or parameters may also be sent using mode one to the sensors, without regard to whether the sensors are integrated with a device or are separate components on the system. For example, the controller may send data parameters for the sensor's native commands. For example, if the sensor is a temperature sensor, the sensor may include a dimming command. The dimming command may specify dimming to a lower wattage when a temperature parameter is met. By way of example and not limitation, the controller may specify that the temperature sensor should send a dimming command to the light to 50% of the current wattage if a temperature of 80 degrees Fahrenheit is detected by the sensor. The sensor may further include a shutdown command. The shutdown command may turn off the light fixture if the sensor assigned to the light detects a temperature indicated in by parameter sent by the controller. By way of example and not limitation, if the temperature parameter sent by the controller is 90 degrees Fahrenheit, and the sensor detects a temperature of 90 degrees Fahrenheit, the sensor may send a command to the lighting fixture to shut down. If the sensor is a separate component of the system, the controller may send control signals to the sensor assigning devices to which the sensor is to send control signals. Because the controller is sent identification information by all the system components, a user may identify the components and make the assignment using the controller. Alternatively, the controller may include algorithms which assign sensors to devices automatically.

On the receiving end, the control signal 600 is received on the receiving circuit 108. After being amplified, the control signal is passed to the ultra narrow band filter of the device transceiver 126a-k or sensor transceiver, if sensors are implemented as separate components on the system, as is shown in Step 440 of FIG. 4. The ultra narrow band filters may operate to bandpass a bandwidth of 20 Hz or less centered on the transmission frequency of the crystal oscillator from the signal on the power line. Naturally, the rest of the signal on the power line may be unaffected so that the power on the power line may be used to power devices and sensors on the system. The 20 Hz or less bandwidth captures the control signal because the phase changes do nothing to spread the bandwidth of the original sinusoidal wave generated by the crystal oscillator. That is to say, the signal is not frequency modulated. Alternatively, the filter may pass a bandwidth of well than 20 Hz or more than 20 Hz.

Following the filtering, the protocol stored on a memory 123a-h, and executing on a processor 127a-h on each of the devices 130a-h, the protocol stored on a memory 123a-h, and executing on a processor 127a-h on each of the devices, the protocol stored on a memory 134a, 134b, and executing on a processor 136a, 136b on each of the sensors, or integrated device and sensor, detects and analyzes the information in the control signal 150. The control information encoded on the control signal 150 may be decoded and converted by the protocol as is shown in Step 450 of FIG. 4. Based on where the detected phase states, and the timing of the control signal in each phase state, the control signal may be converted to a series of binary digits, or a series of ones and zeros. The conversion may then be used to determine instructions which are executable to give commands to the devices and to set parameters for the sensors, either integrated with the devices or as separate components, as is shown in Step 460 of FIG. 4, and described above. Alternatively, the center point may be defined in the positive portion of the cycle or the negative portion of the cycle. Alternatively, if only two phase states are used, the detector may detect unchanged, or base phase state signals, and assign a first binary state to those signals, as required by the protocol, and assign a second binary state to any other signals which have differing phase states. If multiple phase states are used, then each may be assigned one of the two binary phase states, and the detector may determine at which phase state the signal is located, and assign a binary state to that signal detected at that particular phase state according to the protocol.

The use of ultra-narrow bandwidth and phase changes to encode data and unaltered frequency sinusoidal wave in the control signal provides further robust protection against interference by electrical noise on the power line 112. In order for electrical noise on the system to interfere with the control signal the electrical noise would need both reach in to the narrow bandwidth on which the oscillator is transmitting, and the filter is receiving, and to change phase as the control signal 600 does. This kind of rapid phase change combined with a fixed amount of offset is uncommon in electrical noise, including the noise typically found on power lines. Thus, in addition to all the other ways the system 100 eliminates electrical noise which may affect the control signal 600, even the manner in which the information is encoded to the control signal 600 provides robustness against interference by electrical noise.

After the control signals are sent and received, the system may primarily operate in mode two. Mode two is characterized by a combination of open and closed loop operation, but relies primarily on mode two operation. As described above, the sensors may send command signals using the same encoding as the control signals from the controller. However, no user direction is required when mode two signals are sent by sensors. Based on the parameters provided during mode one, each sensor may automatically send control signals to the assigned devices if any of the stored parameters are reached. Per the example given above for the temperature parameters, if the temperature sensor detects a temperature of 80 degrees Fahrenheit, the temperature sensor may send a control signal containing a dimming command to the temperature sensor's assigned light fixtures. Alternatively, if the temperature sensor detects a temperature of 90 degrees Fahrenheit, the temperature sensor may send a control signal containing a shut-down command to the temperature sensor's assigned light fixtures. All commands which have a temperature as a parameter may be native to the temperature sensor, with the controller providing the parameter of the precise temperature at which the commands should be sent during phase one.

Simultaneously during mode two operation, the controller may still send commands which include time as a parameter. The controller 102 includes a clock function, which may be set to local time. The controller may also include a timing function to control when the devices are powered on and when they are powered off. This function is particularly useful in indoor agriculture, because when sent to lights, it allows the lights to simulate daylight during a 24-hour day cycle. The timing function includes sending a control signal to the one or more light fixtures to power on at a predetermined time, and to power off at a predetermined time. The powering on may be customized by ramping the brightness of the one or more light fixtures up to simulate a sun rise, as described above. Similarly, the powering off may be customized by ramping the brightness of the one or more light fixtures down to simulate a sun set, which is also described above. Both the ramping time, and the starting brightness, as well as the amount of increase in wattage, and therefore resulting brightness, may be parameters which may be set by a user. These parameters may be built in to the controller and will operate essentially autonomously during phase two. As one of ordinary skill in the art will readily recognize, such parameters may be applied to other devices as well. For example, the timing may be used to control a sprinkler system, or a residential or commercial HVAC system.

Of course, the parameters for either the controller or the sensor may be changed at any time by a user. This may be necessary for any number of reasons, but is not required unless there is a component failure. Failure detection is discussed in detail below.

The devices 130a-h or sensors 131a, 131b may, contemporaneously to any control signals from the controller 102, send an acknowledgement of the control signal back to the controller 102, or to the sensor if the system is in mode two operation. The receiver portion of the transceiver 104 or the transceiver on the sensor receives the acknowledgement, the processor on either of the transceivers converts it using the protocol, and, accordingly, the controller 102 or the sensor does not resend the command. In the event that the transceiver 104 or the transceiver on the sensor does not receive the acknowledgement, the protocol operating on the controller 102 or sensor directs the corresponding transceiver to send the command again after a pre-determined time interval. This pattern continues until the acknowledgement is received from the device 130a-k or sensor to which the control signal was sent.

In some circumstances, it may be possible that the device did not send an acknowledgement because the device never received the message. For example, if system is operating in the two or three-digit MHz range or higher, and the signal has to travel through any appreciable distance of wire, the signal may be attenuated by the wire, or by other factors, and not reach the device. In some embodiments the system may have a second set of crystal oscillators which operate at a lower frequency. The instructions stored in memory may include that the next message be sent using this lower frequency. Lower frequency signals generally have better range in every medium. This is also true in the case of electrical wire. Thus, if the initial control signal failed to reach the device, the lower frequency signal is all but guaranteed to reach the device. Thus, if the device fails to respond to the control signal, sending an acknowledgement back to the transceiver operating in conjunction with the controller, or the transceiver associated with a sensor, the user can be all but certain that the reason is that the device is suffering a failure, rather than the signal failing to reach the device. Thus, the device can be checked and serviced in such an instance. If the transceiver operating with the controller receives a acknowledgement from the transceiver associated with the device, then the transceiver operating with the controller will continue to communicate with the device on the lower frequency.

Alternatively, the crystal oscillator circuit may include components which allow access to harmonics of the crystal. The crystal oscillator circuit may use a lower frequency harmonic of the crystal rather than a second crystal to generate the lower frequency control signal. The harmonic may be amplified to a level equivalent to that of the non-harmonic signal. In either this embodiment or the previous embodiment, the entire system may switch to operate on the lower frequency. Alternatively, the controller and transceiver with which it operates may continue to communicate at both frequencies, depending on the device with which it is communicating. Those devices that don't respond on the primary, higher frequency signal, but do respond to the secondary, lower frequency signal, will continue to communicate on the lower frequency signal, both for control signals and acknowledgements. This split frequency system has the advantage of ensuring communication with as many devices as possible while using higher frequencies where possible to give the data rates for the maximum possible number of devices on the system.

Should the controller 102 fail catastrophically, the controller 102 will no longer send commands. While this is certainly a failure, it is not catastrophic for the system as a whole, because such a controller failure is both easy to detect, and the devices on the system may continue to function under the control signals available to the one or more sensors on the system. A controller 102 failure is easy to detect because the controller 102 is typically used by the user to send commands from time to time, and may further automated commands, as described above. A user is likely to notice if automated commands are not executed. Thus, if, for example, the system includes lights, and all of the lights fail to turn on or off, there is likely a failure in the controller.

As disclosed, through the decentralized control, the lighting system has internal robustness against the risk of a failure of a central controller. The one or more sensors on the system will continue to function. In embodiments where the one or more sensors include instructions to issue control signals to the devices on the system, the sensors will continue to do so. Thus, if, for example, the lights on a system are not turned off due to a controller catastrophic failure, the temperature may get high enough where the temperature may be detrimental to the plants of an indoor agricultural system. However, even if the controller 102 has failed, the one or more temperature sensors may dim the lights as the first predetermined temperature is reached, and then may shut the lights off as the second predetermined temperature is reached. In this way, the decentralized control prevents damage to the plants. If the light fixtures don't come back on, the controller 102 failure is again easily detected and rectified by replacing the controller and starting back up.

It may be possible that, over time, each of the crystal oscillators may have some drift in the transmission frequency. The crystal oscillator circuit may include portions which are directed to correcting for any frequency drift. The crystal oscillator circuit may include components which allow the transmission frequency to be tuned. The tuning may be done manually, through adjustments of the circuit by a user. Alternatively, the crystal oscillator circuit may include components which monitor the transmission frequency and adjust the transmission frequency automatically back to a pre-determined transmission frequency if there is any drift detected.

Alternatively, or in addition, the crystal filters may be tuned. Similar to the crystal oscillation circuit, the crystal filter may be tuned manually or automatically. For example, if the transmission frequency of the transceiver operating with the controller beings to drift, the transmission frequency may be adjusted to match where it was previously, so that only a single transceiver has to be adjusted, and not several. Alternatively, the crystal filters may be tuned to match the drifted signal of the controller transceiver. As a still further alternative, both the controller transceiver may be tuned. For example, either the controller transceiver or the device transceiver may be automatically tuned. For example, the crystal filter may include an auto center function where the crystal filter scans a bandwidth of possible frequencies, and when it finds a transceiver signal, centers on that signal.

The above description is given by way of example, and not limitation. Given the above disclosure, one skilled in the art could devise variations that are within the scope and spirit of the invention disclosed herein, including various ways of defining the commands in the protocol. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for controlling devices via power line communication, comprising:
    a controller which sends commands indicative of a user's operation of the controller;
    a first transceiver electrically connected to the controller, the first transceiver including a first transmitter, including:
        a first crystal oscillator circuit including a first crystal oscillator powered to transmit a first sinusoidal wave at a clock frequency from a first output;
        a second crystal oscillator circuit including a second crystal oscillator powered to transmit a second sinusoidal wave at a transmission frequency and a first phase from a second output;
        a signal splitter connected to the second output, the signal splitter splitting the second sinusoidal wave to a first signal and a second signal and outputting the first signal to a third output and the second signal to a fourth output;
        a phase shift circuit electrically connected to the fourth output and the first output, the phase shift circuit receiving the second signal and phase shifting the second signal to a second phase, the amount of phase shift being indexed by a ratio of the clock frequency and the transmission frequency, and the phase shift circuit including a fifth output for outputting the second signal at the second phase;
        a switch including a first terminal, a second terminal, and a third terminal, the switch electrically connected to the third output at the first terminal, the fifth output at the second terminal, and to a baseband signal output transmitting a baseband signal at the third terminal, the switch operating to switch between alternately outputting the first signal and the second signal as directed by the baseband signal, the output combination of the first signal and the second signal forming a control signal;
        a transceiver output on a common of the switch for outputting the control signal;
    a power line electrically connected to the transceiver output;
    one or more electrical outlets electrically connected to the power line;
    one or more devices electrically connected to the one or more electrical outlets, the one or more devices each including:
        a second transceiver including a receiver, the receiver including an ultra narrow band filter which filters a bandwidth centered around the transmission frequency; and
        a baseband decoder electrically connected to the ultra narrow band filter, the baseband decoder recovering the baseband signal from the control signal.

2. The system of claim 1, further comprising at least one sensor.

3. The system of claim 2, further comprising a processor electrically connected to each of the at least one sensor, and a memory electrically connected to the processor.

4. The system of claim 3, further comprising a third transceiver electrically connected to the at least one senor and located between the sensor and the power line.

5. The system of claim 4, wherein one of the at least one sensor sends control signals to only one of the one or more devices.

6. The system of claim 5, wherein the one of the at least one sensor sends control signals to the only one of the one or more devices based on parameters sent to the sensor by the controller.

7. The system of claim 1, wherein the baseband decoder interprets a first phase state of the control signal as a first binary state and a second phase state of the control signal as a second binary state.

8. A method for providing power line communication, comprising:
    generating a sinusoidal wave using a crystal oscillator;
    splitting the sinusoidal wave in to a first signal and a second signal;
    phase shifting the second signal using a phase shift circuit, wherein the phase of the second signal is shifted according to an index of a clock frequency generated by a clock crystal oscillator electrically connected to the phase shift circuit;
    outputting the first signal and the second signal to a switch;
    forming a control signal by operating the switch to alternate between outputting the first signal and the second, phase shifted signal according to a baseband signal, the first signal and the second, phase shifted signal imparting different phase states to respective portions of the control signal, the respective portions encoding binary information on the control signal;
    outputting the control signal to a power line;
    receiving the control signal on a receiver including an ultra narrow band filter, the receiver being electrically connected to the power line;
    decoding the control signal to executable instructions using the protocol; and
    controlling the operation of at least one device based on the decoded control signal.

9. The method of claim 8, wherein the phase shift circuit is part of an integrated circuit.

10. The method of claim 8, wherein the control signal may include information for one or more sensors connected to the power line.

11. The method of claim 10, wherein the information may include parameters for the operation of the sensor.

12. A system for providing power line communication, comprising:
    a smart device which sends commands which are created according to, and interpreted by, a protocol;
    a first transceiver electrically connected to the smart device, the transceiver including a first crystal oscillator generating a first signal sent to a first output;

a signal splitter connected to the first output and outputting the first signal from to a second output and a copy of the first signal to a third output;

a phase shift circuit electrically connected to the third output and including a fourth output, the phase shift circuit configured to shift the phase of the copy of the first signal, creating a second signal with a phase state different from that of the first signal, the phase shift circuit outputting the second signal to the fourth output;

a switch having a first terminal electrically connected to the second output and a second terminal electrically connected to the fourth output, the switch further including a transceiver output;

a first processor electrically connected to the smart device, the switch, and a first memory containing the protocol, the first processor executing the protocol according to the commands from the smart device in order to generate a baseband signal which is output to the switch, the baseband signal controlling the operation of the switch;

a power line connected to the transceiver output;

at least one device electrically connected to the power line, the at least one device including a first receiver including a first ultra narrow band filter, a second processor electrically connected to the first ultra narrow band filter, and a second memory electrically connected to the second processor, the second memory containing a first copy of the protocol; and at least one sensor connected to the power line including a second transceiver, the second transceiver including a second receiver including a second ultra narrow band filter and a third processor electrically connected to the second ultra narrow band filter, a third memory electrically connected to the third processor, the third memory containing a second copy of the protocol;

wherein, when a user operates the smart device to send a command, the protocol, executing on the first processor, converts the command to a control signal by sending a baseband signal to the switch, the switch, according to the baseband signal, alternates between outputting the first signal and the second signal in order to encode the control signal with binary information, the control signal being output to the power line and received at the first ultra narrow band filter, second ultra narrow band filter, or both, analyzed by the first copy of the protocol, second copy of the protocol, or both, executed on the second processor, or the third processor, or both, and converted to instructions for controlling the at least one device, or providing parameters for the at least one sensor, or both.

13. The system of claim 12, wherein the first transceiver further includes a circuit which compensates for frequency drift of the first crystal oscillator.

14. The system of claim 12, wherein the at least one sensor sends control signals based on the parameters.

15. The system of claim 12, wherein the at least one device and the at least one sensor send an acknowledgement to the controller after receiving a control signal.

16. The system of claim 12, wherein the first transceiver can output at a first frequency and a second frequency, the first frequency being an order of magnitude or more higher than the second frequency.

17. The system of claim 16, wherein the second frequency is a harmonic of the first frequency.

18. The system of claim 16, wherein the first receiver and the second receiver can receive on both the first frequency and the second frequency.

19. The system of claim 12, wherein the at least one device and the at least one sensor include a transmitter, the transmitter including a crystal oscillation circuit for sending acknowledgement messages.

* * * * *